(12) United States Patent
Watanabe

(10) Patent No.: US 9,794,252 B2
(45) Date of Patent: Oct. 17, 2017

(54) INFORMATION PROCESSING SYSTEM AND DEVICE CONTROL METHOD

(71) Applicant: Taichi Watanabe, Kanagawa (JP)

(72) Inventor: Taichi Watanabe, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 99 days.

(21) Appl. No.: 14/878,093

(22) Filed: Oct. 8, 2015

(65) Prior Publication Data
US 2016/0112422 A1    Apr. 21, 2016

(30) Foreign Application Priority Data

Oct. 15, 2014  (JP) .................................. 2014-211051
Oct. 2, 2015   (JP) .................................. 2015-196594

(51) Int. Cl.
| | | |
|---|---|---|
| *G06F 7/04* | (2006.01) | |
| *G06F 17/30* | (2006.01) | |
| *H04N 7/16* | (2011.01) | |
| *H04L 29/06* | (2006.01) | |
| *H04W 12/06* | (2009.01) | |
| *H04W 88/02* | (2009.01) | |
| *H04W 4/00* | (2009.01) | |

(52) U.S. Cl.
CPC ......... *H04L 63/0838* (2013.01); *H04W 12/06* (2013.01); *H04L 2463/082* (2013.01); *H04W 4/008* (2013.01); *H04W 88/02* (2013.01)

(58) Field of Classification Search
CPC .............................................. H04L 2463/082
USPC ........................................................ 726/28
See application file for complete search history.

(56) References Cited

U.S. PATENT DOCUMENTS

| | | | |
|---|---|---|---|
| 8,462,677 B1 * | 6/2013 | Gailloux ............... | H04W 68/12 370/310 |
| 9,262,621 B1 * | 2/2016 | Subbiah ................. | G06F 21/41 |
| 2010/0319057 A1 * | 12/2010 | Murai ................... | G06F 21/305 726/5 |

(Continued)

FOREIGN PATENT DOCUMENTS

| | | |
|---|---|---|
| JP | 2007-226827 | 9/2007 |
| JP | 2014-052780 | 3/2014 |

*Primary Examiner* — Morshed Mehedi
*Assistant Examiner* — Khalil Naghdali
(74) *Attorney, Agent, or Firm* — Ipusa, PLLC

(57) ABSTRACT

An information processing system includes a terminal device connected to a first network; and an information processing device connected to a second network that is different from the first network. The terminal device includes an information retrieval unit for retrieving, from an electronic device, identification information of the information processing device and first authentication information; an access data retrieval unit for retrieving access data from the information processing device; and a processing request unit for transmitting a request for processing to the electronic device. The information processing device includes an information providing unit for providing, to the electronic device, the identification information of the information processing device and the first authentication information; an access data providing unit for providing, to the terminal device, the access data; and a processing request transmission determining unit for transmitting the request for processing from the terminal device to the electronic device.

7 Claims, 19 Drawing Sheets

(56) References Cited

U.S. PATENT DOCUMENTS

| | | | |
|---|---|---|---|
| 2011/0185171 A1* | 7/2011 | Karasawa | G06F 21/33 |
| | | | 713/156 |
| 2013/0007207 A1* | 1/2013 | Dietrich | G06F 17/30203 |
| | | | 709/217 |
| 2014/0068714 A1 | 3/2014 | Ono et al. | |
| 2014/0235205 A1* | 8/2014 | Paluch | H04W 12/06 |
| | | | 455/411 |
| 2015/0078362 A1* | 3/2015 | Kunieda | H04W 76/028 |
| | | | 370/338 |
| 2016/0072925 A1* | 3/2016 | Yamada | H04N 1/00244 |
| | | | 726/7 |

* cited by examiner

FIG.9

| INFORMATION | EXAMPLE SETTING |
|---|---|
| RELAY SERVER HOST NAME | test-server |
| INFORMATION STORAGE DEVICE ID | 123456789 |
| ONE-TIME PASSWORD | abcdefg |

FIG.10

| INFORMATION | EXAMPLE SETTING |
|---|---|
| ONE-TIME PASSWORD | abcdefg |
| INFORMATION STORAGE DEVICE ID | 123456789 |
| TERMINAL ID | xxxxxx |

FIG.12

| ITEM | EXAMPLE SETTING |
|---|---|
| TEMPORARY ACCESS USER NAME | P000123456 |
| TEMPORARY ACCESS PASSWORD | xxxyyyzzz |
| TERMINAL ID | xxxxxx |
| EXPIRATION DATA | 2014/07/23 |
| OFFICE SYSTEM LOG-IN USER NAME | P000123456 |
| OFFICE SYSTEM LOG-IN PASSWORD | 123456 |

FIG.17 http://test-server/connect?url=http://10.60.111.222

FIG.18A

Authorization: Basic p000123456:xxxyyyzzz
INFORMATION STORAGE DEVICE ID: 123456789
TERMINAL ID: xxxxxx

FIG.18B

Authorization: Basic cDAwMDEyMzQ1Njp4eHh5eXl6enoNCg==
INFORMATION STORAGE DEVICE ID: 123456789
TERMINAL ID: xxxxxx

FIG.22

| INFORMATION | EXAMPLE SETTING |
|---|---|
| DEVICE ID | MFP0001 |
| DEVICE TYPE | MFP |

FIG.23

| DATE AND TIME | USER ID | DEVICE NAME | DETAILS OF OPERATION | LATITUDE/ LONGITUDE | RESULT | FILE NAME |
|---|---|---|---|---|---|---|
| 2013/8/19 19:00 | Yamada | ○○○ | READING | 35.44,139.74 | SUCCESS | Yamada/file/test.doc |
| 2013/8/19 19:01 | Yamada | ○○○ | CAPTURING | 35.44,139.74 | SUCCESS | Yamada/file/test.doc |
| 2013/8/19 20:00 | Yamada | ○○○ | READING | 35.44,139.74 | SUCCESS | Yamada/file/hoge.pdf |
| 2013/8/19 20:01 | Yamada | ○○○ | PRINTING | 35.44,139.74 | SUCCESS | Yamada/file/hoge.pdf |

INFORMATION PROCESSING SYSTEM AND DEVICE CONTROL METHOD

BACKGROUND OF THE INVENTION

1. Field of the Invention

The present invention relates to an information processing system and a device control method.

2. Description of the Related Art

The following technique has been known for preventing unauthorized access to a computer system. Namely, an authentication server receives a login request with respect to an office network from a first user and an input of information for confirming, by a second user, validity of the login request; and the authentication server transmits electronic information including the information for confirming the validity of the login request to a second user's mobile telephone. The second user's mobile telephone is associated with the first user, in advance (cf. Patent Document 1 (Japanese Unexamined Patent Publication No. 2007-226827), for example).

An electronic device, such as a printer, a multifunction peripheral, or a projector, can be connected to a network, such as a local area network (LAN); and the electronic device can be controlled, through the network, by various terminal devices that can be used by users, such as a mobile telephone, a smartphone, and/or a tablet terminal.

However, the network (e.g., a LAN) to which the electronic device (e.g., a printer, a multifunction peripheral, and/or a projector) is connected may disallow a terminal device that is used by a user to connect to the network, if the terminal device is not registered to the network. It is likely that a terminal device that is used by the user is not registered to the network if the terminal device is a user's personal terminal device.

In this manner, a terminal device that is used by a user may not control an electronic device through a network because the terminal device may not be connected to the network to which the electronic device is connected, unless the terminal device is registered to the network in advance.

SUMMARY OF THE INVENTION

An object of an embodiment of the present invention is to provide an information processing system that allows an electronic device that is connected to a network to be controlled by a terminal device that may not be connected to the network to which the electronic device is connected.

According to an aspect of the present invention, there is provided an information processing system including a terminal device that is connected to a first network; and an information processing device that is connected to a second network, the second network being different from the first network, wherein the terminal device includes an information retrieval unit configured to retrieve, from an electronic device in which a user is successfully authenticated, identification information of the information processing device and first authentication information that is held by the information processing device; an access data retrieval unit configured to retrieve access data from the information processing device by transmitting, to the information processing device that is identified by the identification information of the information processing device, an access data retrieval request that includes the first authentication information and identification information of the terminal device; and a processing request unit configured to transmit a request for processing to the electronic device that is connected to the second network by using the access data, and wherein the information processing device includes an information providing unit configured to provide, to the electronic device in which the user is successfully authenticated, the identification information of the information processing device and the first authentication information that is held by the information processing device; an access data providing unit configured to provide, to the terminal device, the access data that is associated with the identification information of the terminal device, the identification information of the terminal device being included in the access data retrieval request, upon receiving the access data retrieval request that includes the first authentication information and the identification of the terminal device and determining that the information processing device holds the first authentication information that is the same as the first authentication information that is included in the access data retrieval request; and a processing request transmission determining unit configured to transmit, upon receiving the request for processing that is transmitted, by using the access data, from the terminal device to the electronic device that is connected to the second network and determining that the identification information of the terminal device that transmits the request for processing is the same as the identification information of the terminal device that is associated with the access data, the request for processing to the electronic device.

According to another aspect of the present invention, there is provided an information processing system including a terminal device that is connected to a first network; and a program that is installed in an information processing device that is connected to a second network, the second network being different from the first network, wherein the terminal device includes an information retrieval unit configured retrieve, from an electronic device in which a user is successfully authenticated, identification information of the information processing device and first authentication information that is held by the information processing device; an access data retrieval unit configured to retrieve access data from the information processing device by transmitting, to the information processing device that is identified by the identification information of the information processing device, an access data retrieval request that includes the first authentication information and identification information of the terminal device; and a processing request unit configured to transmit a request for processing to the electronic device that is connected to the second network by using the access data, and wherein the program that is installed in the information processing device causes the information processing device to function as: an information providing unit configured to provide, to the electronic device in which the user is successfully authenticated, the identification information of the information processing device and the first authentication information that is held by the information processing device; an access data providing unit configured to provide, to the terminal device, the access data that is associated with the identification information of the terminal device, the identification information of the terminal device being included in the access data retrieval request, upon receiving the access data retrieval request that includes the first authentication information and the identification of the terminal device and determining that the information processing device holds the first authentication information that is the same as the first authentication information that is included in the access data retrieval request; and a processing request transmission determining unit configured to transmit, upon receiving the request for processing that is transmitted, by using the access data, from the terminal device to the electronic device that is connected to the second network and determining that the identification information of the terminal device that transmits the request for processing is the same as the identification information of the terminal device that is associated with the access data, the request for processing to the electronic device.

According to another aspect of the present invention, there is provided an information processing system including an application that is installed in a terminal device that is connected to a first network; and an information processing device that is connected to a second network, the second network being different from the first network, wherein the application that is installed in the terminal device causes the terminal device to function as: an information retrieval unit configured retrieve, from an electronic device in which a user is successfully authenticated, identification information of the information processing device and first authentication information that is held by the information processing device; an access data retrieval unit configured to retrieve access data from the information processing device by transmitting, to the information processing device that is identified by the identification information of the information processing device, an access data retrieval request that includes the first authentication information and identification information of the terminal device; and a processing request unit configured to transmit a request for processing to the electronic device that is connected to the second network by using the access data, and wherein the information processing device includes an information providing unit configured to provide, to the electronic device in which the user is successfully authenticated, the identification information of the information processing device and the first authentication information that is held by the information processing device; an access data providing unit configured to provide, to the terminal device, the access data that is associated with the identification information of the terminal device, the identification information of the terminal device being included in the access data retrieval request, upon receiving the access data retrieval request that includes the first authentication information and the identification of the terminal device and determining that the information processing device holds the first authentication information that is the same as the first authentication information that is included in the access data retrieval request; and a processing request transmission determining unit configured to transmit, upon receiving the request for processing that is transmitted, by using the access data, from the terminal device to the electronic device that is connected to the second network and determining that the identification information of the terminal device that transmits the request for processing is the same as the identification information of the terminal device that is associated with the access data, the request for processing to the electronic device.

According to another aspect of the present invention, there is provided an information processing system including an application that is installed in a terminal device that is connected to a first network; and a program that is installed in an information processing device that is connected to a second network, the second network being different from the first network, wherein the application that is installed in the terminal device causes the terminal device to function as: an information retrieval unit configured retrieve, from an electronic device in which a user is successfully authenticated, identification information of the information processing device and first authentication information that is held by the information processing device; an access data retrieval unit configured to retrieve access data from the information processing device by transmitting, to the information processing device that is identified by the identification information of the information processing device, an access data retrieval request that includes the first authentication information and identification information of the terminal device; and a processing request unit configured to transmit a request for processing to the electronic device that is connected to the second network by using the access data, and wherein the program that is installed in the information processing device causes the information processing device to function as: an information providing unit configured to provide, to the electronic device in which the user is successfully authenticated, the identification information of the information processing device and the first authentication information that is held by the information processing device; an access data providing unit configured to provide, to the terminal device, the access data that is associated with the identification information of the terminal device, the identification information of the terminal device being included in the access data retrieval request, upon receiving the access data retrieval request that includes the first authentication information and the identification of the terminal device and determining that the information processing device holds the first authentication information that is the same as the first authentication information that is included in the access data retrieval request; and a processing request transmission determining unit configured to transmit, upon receiving the request for processing that is transmitted, by using the access data, from the terminal device to the electronic device that is connected to the second network and determining that the identification information of the terminal device that transmits the request for processing is the same as the identification information of the terminal device that is associated with the access data, the request for processing to the electronic device.

According to another aspect of the present invention, there is provided an information processing system including a terminal device that is connected to a first network; an information processing device that is connected to a second network, the second network being different from the first network; and an electronic device that is connected to a second network; wherein the electronic device includes an authentication processor configured to authenticate a user; and an information holding unit configured to retrieve, from the information processing device, identification information of the information processing device and first authentication information that is held by the information processing device, and configured to store the retrieved identification and the retrieved first authentication information, upon the authentication processor successfully authenticating the user, wherein the terminal device includes an information retrieval unit configured retrieve, from the electronic device in which the user is successfully authenticated, the identification information of the information processing device and the first authentication information that is held by the information processing device; an access data retrieval unit configured to retrieve access data from the information processing device by transmitting, to the information processing device that is identified by the identification information of the information processing device, an access data retrieval request that includes the first authentication information and identification information of the terminal device; and a processing request unit configured to transmit a request for processing to the electronic device that is connected to the second network by using the access data, and wherein the information processing device includes an information providing unit configured to provide, to the electronic device in which the user is successfully authenticated, the identification information of the information processing device and the first authentication information that is held by the information processing device; an access data providing unit configured to provide, to the terminal device, the access data that is associated with the identification information of the terminal device, the identification information of the terminal device being included in the access data retrieval request, upon receiving the access data retrieval request that includes the first authentication information and the identification of the terminal device and determining that the information processing device holds the first authentication information that is the same as the first authentication information that is included in the access data retrieval request; and a processing request transmission determining unit configured to transmit, upon receiving the request for processing that is transmitted, by using the access data, from the terminal device to the electronic device that is connected to the second network and determining that the identification information of the terminal device that transmits the request for processing is the same as the identification information of the terminal device that is associated with the access data, the request for processing to the electronic device.

According to another aspect of the present invention, there is provided a device control method that is to be executed by an information processing system, the information processing system including a terminal device that is connected to a first network; and an information processing device that is connected to a second network, the second network being different from the first network, wherein the method includes an information providing step, by the information processing device, of providing, to an electronic device in which a user is successfully authenticated, identification information of the information processing device and first authentication information that is held by the information processing device; an information retrieving step, by the terminal device, of retrieving, from the electronic device in which the user is successfully authenticated, the identification information of the information processing device and the first authentication information that is held by the information processing device; an access data retrieval requesting step, by the terminal device, of transmitting an access data retrieval request that includes the first authentication information and identification information of the terminal device to the information processing device that is identified by the identification information of the information processing device; an access data providing step, by the information processing device, of providing, to the terminal device, the access data that is associated with the identification information of the terminal device, the identification information of the terminal device being included in the access data retrieval request, upon receiving the access data retrieval request that includes the first authentication information and the identification of the terminal device and determining that the information processing device holds the first authentication information that is the same as the first authentication information that is included in the access data retrieval request; an access data retrieval step, by the terminal device, of retrieving access data from the information processing device; a processing request step, by the terminal device, of transmitting a request for processing to the electronic device that is connected to the second network by using the access data; and a processing request transmission determining step, by the information processing device, of transmitting, upon receiving the request for processing that is transmitted, by using the access data, from the terminal device to the electronic device that is connected to the second network and determining that the identification information of the terminal device that transmits the request for processing is the same as the identification information of the terminal device that is associated with the access data, the request for processing to the electronic device.

According to the embodiment of the present invention, the electronic device can be controlled from the terminal device that may not be connected to the network to which the electronic device is connected.

Other objects, features and advantages of the present invention will become more apparent from the following detailed description when read in conjunction with the accompanying drawings.

BRIEF DESCRIPTION OF THE DRAWINGS

FIG. 9 is a diagram showing an example of a configuration of information that is embedded in a quick response (QR) code for authentication;

FIG. 10 is a diagram showing an example of a configuration of authentication data that is to be transmitted from the smartphone to the information storage device;

FIG. 12 is a diagram showing an example of a configuration of temporary access data that is to be stored in the information storage device;

FIG. 17 is a diagram showing an example of a configuration of a processing request uniform resource locator (URL);

FIGS. 18A and 18B are diagrams showing examples of a configuration of the access data, an information storage device identification (ID), and a terminal identification (ID) that are included in a device information page viewing request;

FIG. 22 is a diagram showing an example of information that is embedded in an identification QR code; and FIG. 23 is a diagram showing an example of information that is stored in the information storage device.

DETAILED DESCRIPTION OF THE PREFERRED EMBODIMENTS

An embodiment of the present invention is explained in detail below. A cooperative processing system 1 according to the embodiment can be an example of an information processing system.

<System Configuration>

Figure 1:
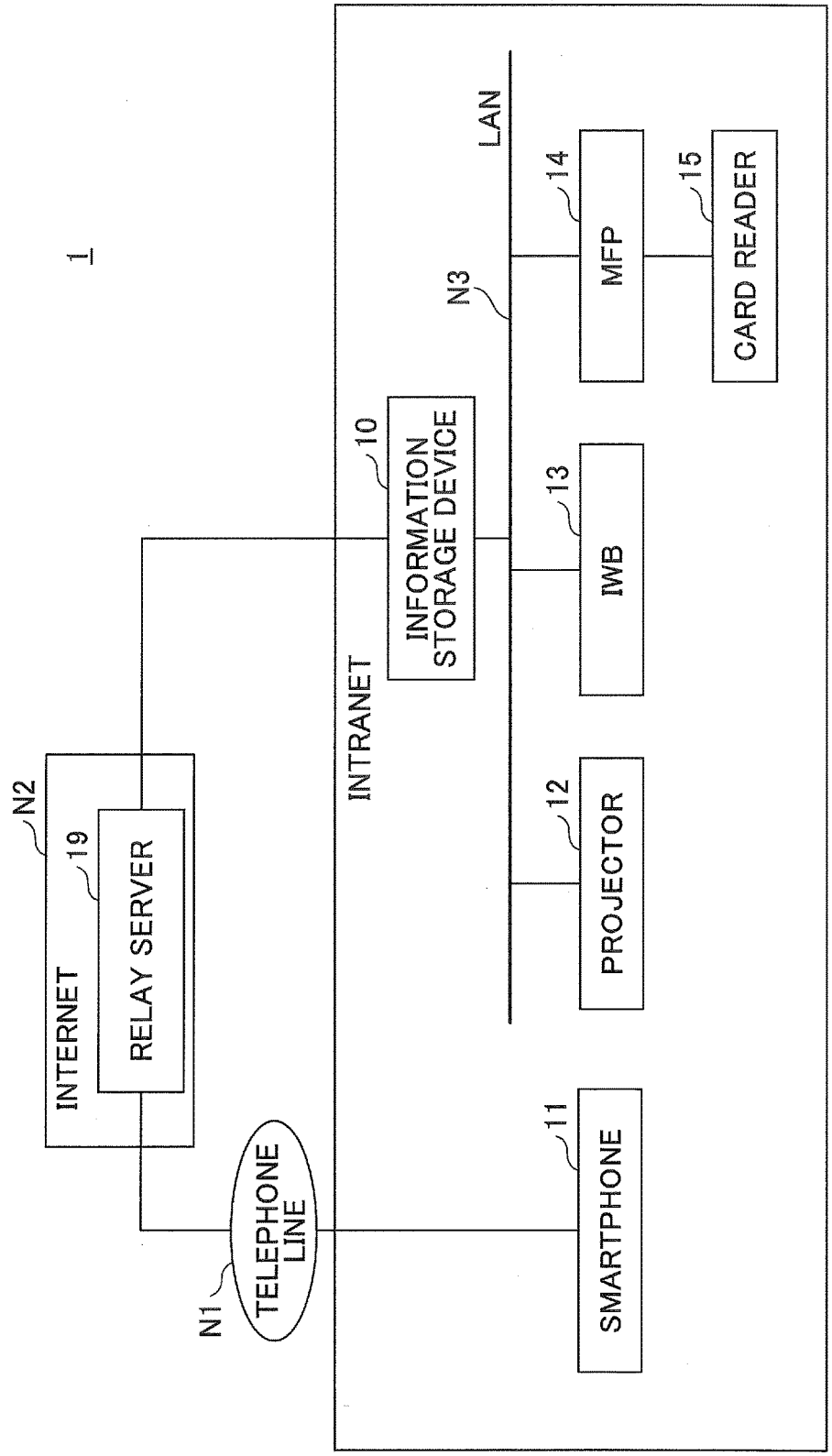
FIG. 1 is a diagram showing an example of a configuration of a cooperative processing system according to an embodiment.

FIG. 1 is a diagram showing an example of the cooperative processing system 1 according to the embodiment. The cooperative processing system 1 may include, for example, an information storage device 10; a smartphone 11; a projector 12; an interactive whiteboard (IWB) 13; a multi-function peripheral (MFP) 14; a card reader 15; and a relay server 19.

In the cooperative processing system 1, the information storage device 10, the projector 12, the IWB 13, and the MFP 14 can be connected to a network N3, such as a local area network (LAN). An intranet for a private environment, such as an office network, can be used as the network N3. As described above, the information storage device 10, the projector 12, the IWB 13, and the MFP 14 can be located within an intranet environment. The card reader 15 can be connected to the MFP 14. Further, in the cooperative processing system 1, the information storage device 10 can be connected to a network N2, such as the Internet.

Further, in the cooperative processing system 1, the network N2, such as the Internet, may include a relay server 19. The cooperative processing system 1 may also include the smartphone 11 that can be connected to a network N1, such as a telephone line. By using the network N1, the smartphone 11 can be connected to the relay server 19 that may be included in the network N2. Furthermore, the information storage device 10 can be connected to the relay server 19 that may be included in the network N2.

A telephone line, such as a 3G line, can be used as the network N1. The relay server 19 that may be included in the network N2 can be omitted for a case in which the smartphone 11 can be directly connected to the information storage device 10 through the networks N1 and N2.

The information storage device 10 can be an example of an information processing device having an information sharing function. The information storage device 10 can execute a process of an advanced function that may not be processed by the smartphone 11; a process as a file server; and a process of connecting to the relay server 19 and retrieving a request from the smartphone 11. Functions of the information storage device 10 may be distributed over a plurality of computers.

The smartphone 11 can be an example of a terminal device that can be operated by a user. Examples of the terminal device may include, in addition to the smartphone 11, a device that can be operated by a user, such as a mobile telephone, a laptop personal computer (PC), and a tablet terminal.

The projector 12, the IWB 13, and the MFP 14 can be examples of an electronic device that can be controlled by the smartphone 11. The projector 12, the IWB 13, and the MFP 14 may provide interfaces (IFs) on the network N3, respectively.

The projector 12 can be an example of an image projection device. The IWB 13 can be an example of an image display device. The MFP 14 can be an example of an image forming device. The MFP 14 may include an image capturing function, an image forming function, and so forth. The card reader 15 can be an example of a device that can retrieve authentication information of a user from an IC card, such as a staff identity card. The authentication information of the user that can be retrieved by the card reader 15 can be used as information for logging in to an office system (e.g., a user name and a password for logging in to the office system), for example. The card reader 15 can be a device that can communicate in accordance with a short range radio communication standard, such as the Bluetooth (registered trademark) standard or the Near Field Communication (NFC) standard.

<Hardware Configuration>

<<Computer>>

Figure 2:
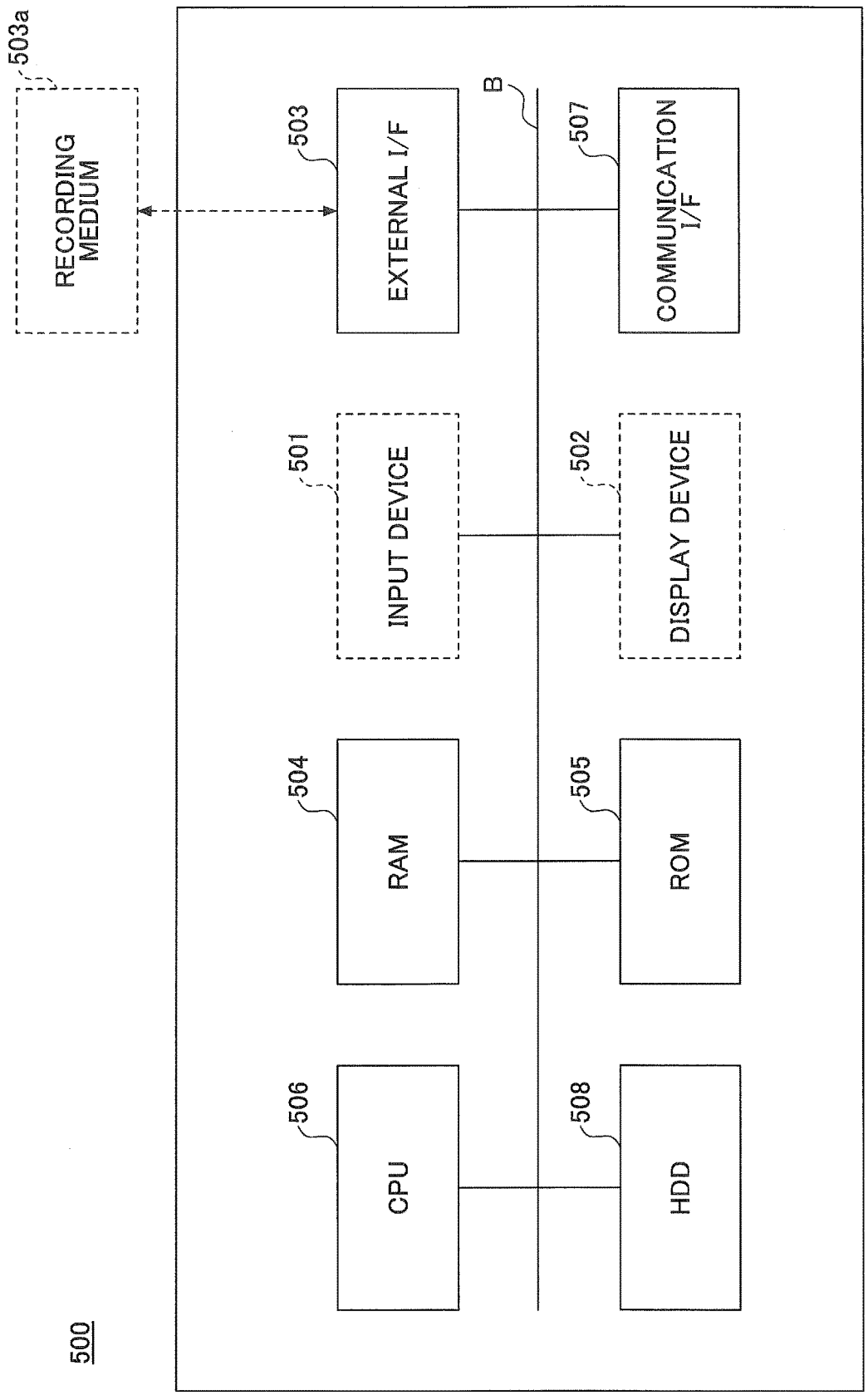
FIG. 2 is a diagram showing an example of a hardware configuration of a computer according to the embodiment.

Each of the information storage device 10 and the relay server 19 can be implemented by a computer 500 having a hardware configuration, such as that of shown in FIG. 2. FIG. 2 is a diagram showing an example of the hardware configuration of the computer 500 according to the embodiment.

The computer 500 of FIG. 2 may include an input device 501; a display device 502; an external interface (I/F) 503; a random access memory (RAM) 504; a read-only memory (ROM) 505; a central processing unit (CPU) 506; a communication interface (I/F) 507; a hard disk drive (HDD) 508, and so forth. These components can be mutually connected a bus B. Note that the input device 501 and the display device 502 may be devices that are separated from the computer 500. In this case, depending on necessity, the input device 501 and the display device 502 can be used by connecting to the computer 500.

The input device 501 may include a keyboard, a mouse, a touch panel, and so forth. The input device 501 can be used, by a user, for inputting various operation signals. The display device 502 may include a display and the like. The display device 502 can display a processing result by the computer 500.

The communication I/F 507 can be an interface for connecting the computer 500 to various types of networks. Thus, the computer 500 can execute data communication through the communication I/F 507.

Further, the HDD 508 is an example of a nonvolatile storage device for storing a program and data. The program and the data that can be stored in the HDD 508 may include an operating system (OS) that is the system software for controlling the entire computer 500, and application software (which is simply referred to as the application, hereinafter) that can provide various functions on the OS. Note that the computer 500 may use, instead of the HDD 508, a drive device (e.g., a slid state drive (SSD)) that uses a flash memory as a storage medium.

The external I/F 503 is an interface to an external device. The external device may include a recording medium 503a, for example. The computer 500 can read data from the recording medium 503a and write data in the recording medium 503a through the external I/F 503. Examples of the recording medium 503a may include a flexible disk, a compact disk (CD), a digital versatile disk (DVD), a Secure Digital (SD) memory card, a universal serial bus (USB) memory, and so forth.

The ROM 505 is an example of a non-volatile semiconductor memory (storage device) that can maintain a program and data even if the power supply is turned off. The ROM 505 may store a program and data, such as a basic input/output system (BIOS) that is to be executed during activation of the computer 500, a setting of the OS, and a setting of a network. The RAM 504 is an example of a volatile semiconductor memory (storage device) that can temporarily maintain a program and data.

The CPU 506 is a processor that is for controlling the entire computer 500 and for achieving functions of the computer 500 by reading out a program and data from a storage device, such as the ROM 505 or the HDD 508, onto the RAM 504, and by executing a process.

The information storage device 10 and the relay server 19 can achieve various types of processes, which are described below, by the hardware configuration of the computer 500 that is shown in FIG. 2, for example.

<<Terminal Device>>

Figure 3:
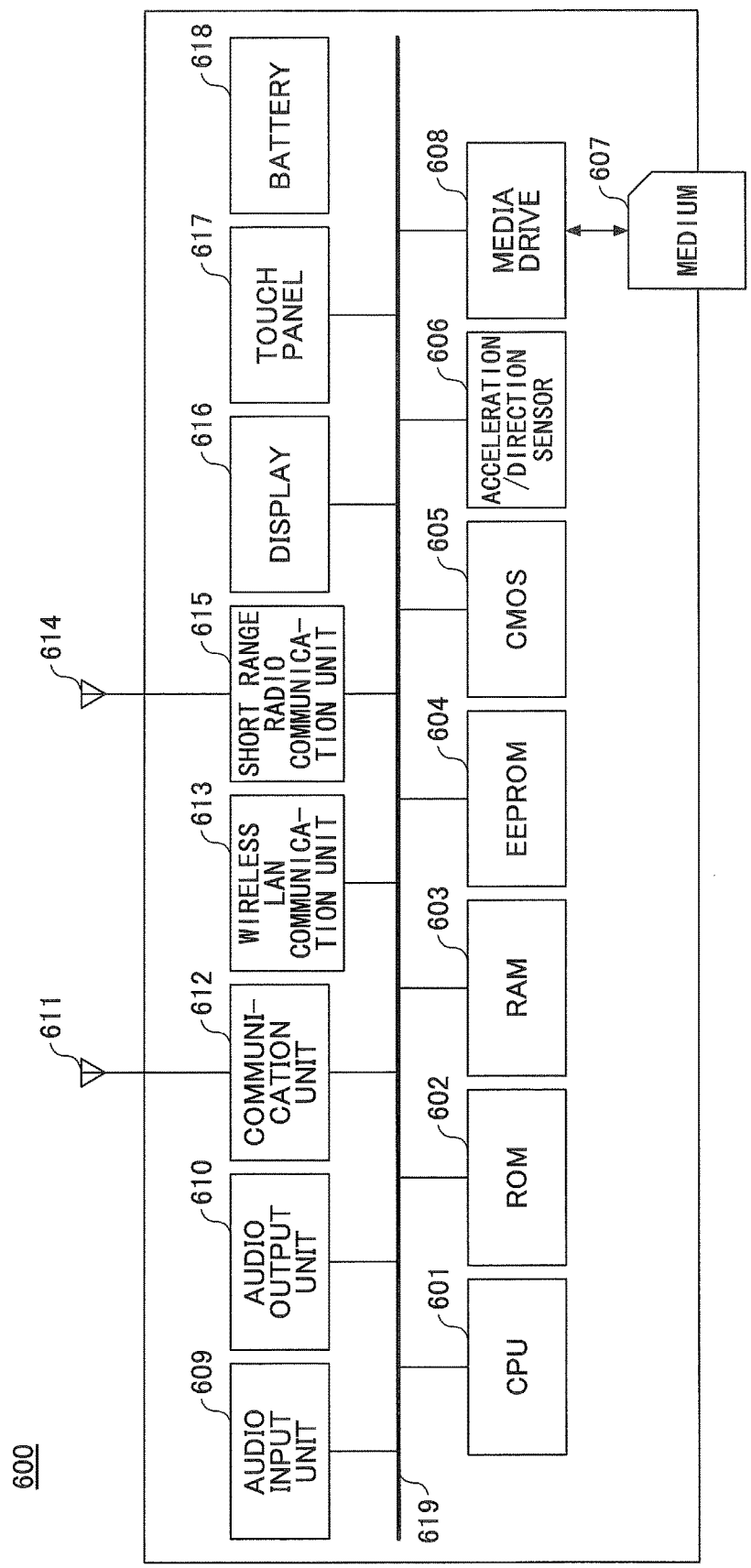
FIG. 3 is a diagram showing an example of a hardware configuration of a terminal device according to the embodiment.

The smartphone 11 can be achieved by a hardware configuration that is shown in FIG. 3, for example. FIG. 3 is a diagram showing an example of a hardware configuration of the terminal device according to the embodiment. The terminal device 600 of FIG. 3 may include a CPU 601; a ROM 602; a RAM 603; an EEPROM 604; a CMOS sensor 605; an acceleration/direction sensor 606; and a media drive 608, for example.

The CPU 601 can control the entire terminal device 600. The ROM 602 can store a basic input/output program. The RAM 603 can be used as a work area of the CPU 601. The EEPROM 604 can read and write data in accordance with control by the CPU 601. The CMOS sensor 605 can take a photograph of an object in accordance with control of the CPU 601, and the COMS sensor 605 can obtain image data. The acceleration/direction sensor 606 can be an electromagnetic compass for detecting terrestrial magnetism, a gyrocompass, an acceleration sensor, or the like.

The media drive 608 is for controlling reading data from and writing (storing) data in the recording medium 607, such as a flash memory. The media drive 608 can be configured such that the recording medium 607, from which the recorded data can be read out or in which new data can be written, can be detachably attached.

Note that the EEPROM 604 may store the OS that is to be executed by the CPU 601; association information that may be required for network setting; and the like. The application for executing various types of processes of the embodiment of the present invention can be stored in the EEPROM 604 or the recording medium 607, for example.

The CMOS sensor 605 is a charge coupled device that is for converting an image of an object into an electronic form by converting light into electric charges. The CMOS sensor 605 can be a Charge Coupled Device (CCD) sensor, for example, provided that an image of an object can be captured by the CCD sensor.

The terminal device 600 may further include an audio input unit 609; an audio output unit 610; an antenna 611; a communication unit 612; a wireless LAN communication unit 613; a short range radio communication antenna 614; a short range radio communication unit 615; a display 616; a touch panel 617; and a bus line 619.

The audio input unit 609 can convert sound into an audio signal. The audio output unit 610 can convert an audio signal into sound. The communication unit 612 can communicate with the closest base station device through a radio communication signal by using the antenna 611. The wireless LAN communication unit 613 can execute wireless LAN communication with an access point in accordance with the IEEE 804.11 standard. The short range radio communication unit 615 can execute short range radio communication by using the short range radio communication antenna 614.

The display 616 can be a liquid crystal display or an organic electroluminescence display, for example, that can display an image of an object or various types of icons. The touch panel 617 can be laminated on the display 616. The touch panel 617 may be formed of a pressure-sensitive panel or an electrostatic panel. The touch panel 617 can detect a position on the display 616 that is touched by a finger or a touch pen, for example. The bus line 619 can be an address bus, a data bus, or the like that is for electrically connecting the above-described components.

Additionally, the terminal device 600 may include a dedicated battery 618. The terminal device 600 can be driven by the battery 618. Note that the audio input unit 609 may include a microphone for inputting sound. The audio output unit 610 may include a speaker for outputting sound.

The smartphone 11 can implement various types of processes, which are described below, by the hardware configuration of the terminal device 600 that is shown in FIG. 3, for example.

<<Electronic Device>>

Figure 4:
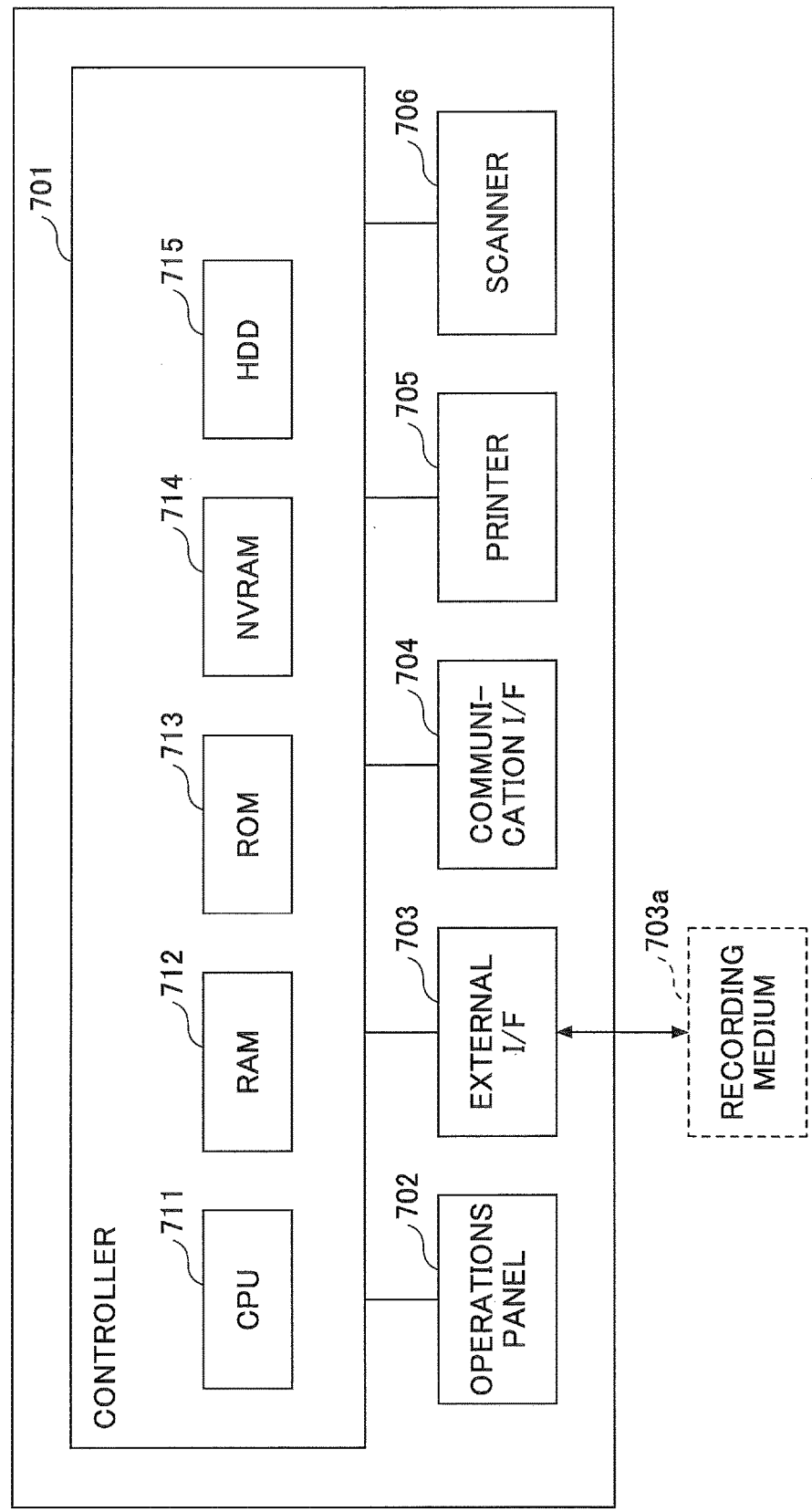
FIG. 4 is a diagram showing an example of a hardware configuration of a multifunction peripheral (MFP) according to the embodiment.

A hardware configuration of the MFP 14 is explained below. The MFP 14 can be an example of the electronic device. FIG. 4 is a diagram showing an example of a hardware configuration of the MFP 14 according to the embodiment. The MFP 14 that is shown in FIG. 4 may include a controller 701; an operations panel 702; an external I/F 703; a communication I/F 704; a printer 705; a scanner 706, and so forth.

The controller 701 may include a CPU 711; a RAM 712; a ROM 713; a NVRAM 714; an HDD 715, and so forth. The ROM 713 may store various types of programs and data. The RAM 712 may temporarily store a program and data. The NVRAM 714 may store setting information or the like. Further, the HDD 715 may store various types of programs and data.

The CPU 711 is for controlling the entire MFP 14 and for achieving functions of the MFP 14 by reading out a program and data from the ROM 713, the NVRAM 714, the HDD 715, or the like onto the RAM 712, and by executing a process.

The operations panel 702 may include an input unit for receiving an input by a user; and a display unit for displaying. The external I/F 703 is an interface to an external device. The external device may include a recording medium 703a, for example. The MFP 14 can read data from the recording medium 703a and/or write data in the recording medium 703a through the external I/F 703. Examples of the recording medium 703a may include an IC card, a flexible disk, a compact disk (CD), a digital versatile disk (DVD), a Secure Digital (SD) memory card, a universal serial bus (USB) memory, and so forth.

The communication I/F 704 is an interface that is for connecting the MFP 14 to the network N3. The MFP 14 can execute data communication through the communication I/F 704. The printer 705 is a printing device for printing print data onto a paper sheet. The scanner 706 is a reading device for reading image data (electronic data) from an original document.

<Software Configuration>
<<Information Storage Device>>

Figure 5:
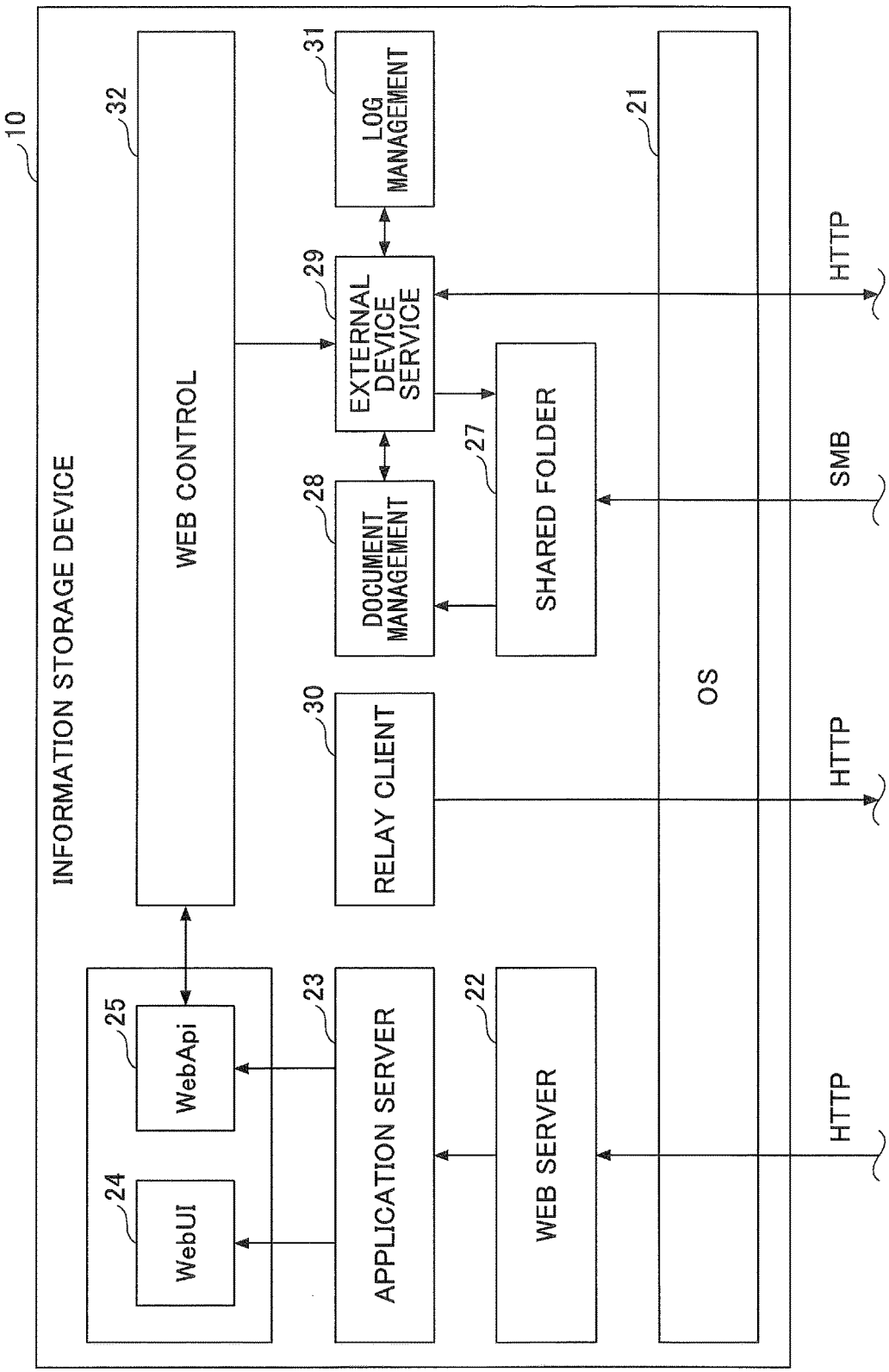
FIG. 5 is a diagram showing an example of processing blocks of an information storage device according to the embodiment.

The information storage device 10 according to the embodiment can be achieved by the processing blocks that are shown in FIG. 5, for example. FIG. 5 is a diagram showing an example of processing blocks of the information storage device 10 according to the embodiment. By executing programs that are installed in the information storage device 10, the information storage device 10 can implement functions of an OS 21; a Web server 22; an application server 23; a Web UI 24; a WebApi 25; a shared folder 27; a document management 28; an external device service 29; a relay client 30; a log management 31; and a Web control 32.

The OS 21 can be an operating system of the information storage device 10, and the OS 21 can control the entire system. The OS 21 may be Windows (registered trademark) or Linux (registered trademark), for example.

The Web server 22 can be software for transmitting and receiving information in Hyper Text Transfer Protocol (HTTP). The Web server 22 can be Apache (registered trademark) or ITS (registered trademark), for example.

The application server 23 is software that can operate as a plug-in for the Web server 22, for example. The application server 23 can be Tomcat (registered trademark), for example.

The Web UI 24 can display a system setting screen in response to an HTTP request. A user can change settings through the system setting screen by using a Web browser (not shown).

The WebApi (Application Programming Interface) 25 can be used through the network N2 or the network N3. The WebApi 25 can receive an HTTP request, the WebApi 25 can execute a process corresponding to the HTTP request, and the WebApi 25 can transmit an HTTP response.

The WebApi 25 is a predefined interface that is provided for receiving a request from a terminal device, such as the smartphone 11. The WebApi 25 may include functions and classes, for example.

The Web control 32 can execute, in response to a request from the WebApi 25, a process of controlling the external device service 29. The shared folder 27 may be a folder that is published on the networks N2 and N3 by a Server Message Block (SMB) protocol. A user can access the shared folder 27 by using the smartphone 27.

Further, the document management 28 can manage a file that is stored in the shared folder 27. In response to a request from the external device service 29, the document management 28 can execute a process of file conversion. Note that, in the embodiment, a file may be a form of data.

The external device service 29 can transmit a request to a Web service of an electronic device, such as the projector 12, the IWB 13, or the MFP 14. The relay client 30 can access the relay server 19, and the relay client 30 can execute a process of retrieving a request from the smartphone 11. The log management 31 can execute a process of managing log data (log information).

<<Smartphone>>

Figure 6:
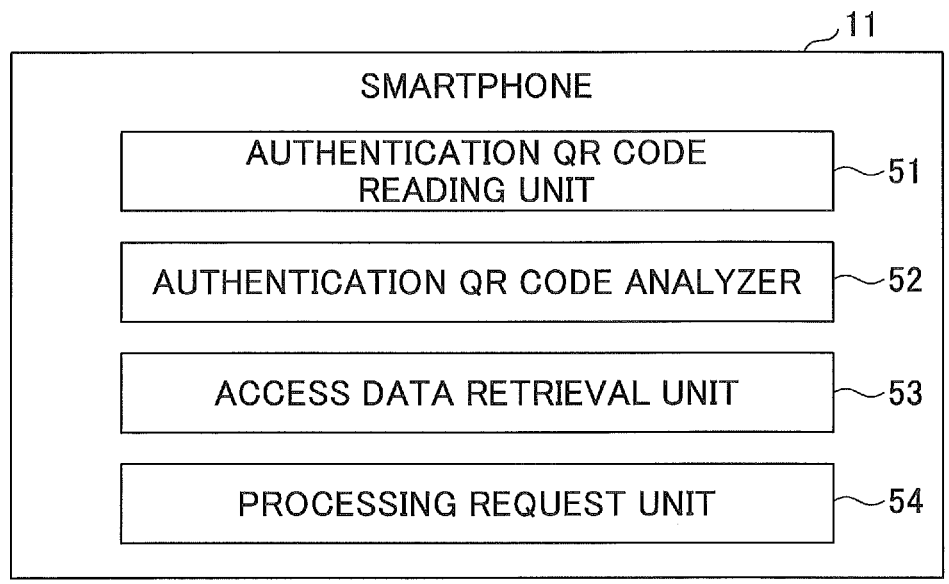
FIG. 6 is a diagram showing an example of processing blocks of a smartphone according to the embodiment.

The smartphone 11 according to the embodiment can be achieved by processing blocks that are shown in FIG. 6, for example. FIG. 6 is a diagram showing an example of the processing blocks of the smartphone 11 according to the embodiment. The smartphone 11 can implement an authentication QR code reading unit 51; an authentication QR code analyzer 52; an access data retrieval unit 53; and a processing request unit 54 by executing a program (an application) that is installed in the smartphone 11.

The authentication QR code reading unit 51 can read an authentication QR code (registered trademark) that can be displayed by an electronic device, such as the MFP 14. The authentication QR code is described below. The authentication QR code analyzer 52 can analyze the read authentication QR code. The access data retrieval unit 53 can create authentication data, which is described below, in accordance with a result of analyzing the authentication QR code. The access data retrieval unit 53 can retrieve access data, which is described below, by transmitting the authentication data to the information storage device 10 through the relay server 19. The processing request unit 54 can transmit, by using the access data, a request for processing to an electronic device (e.g., the MFP 14) through the relay server 19 and the information storage device 10.

<<MFP>>

Figure 7:
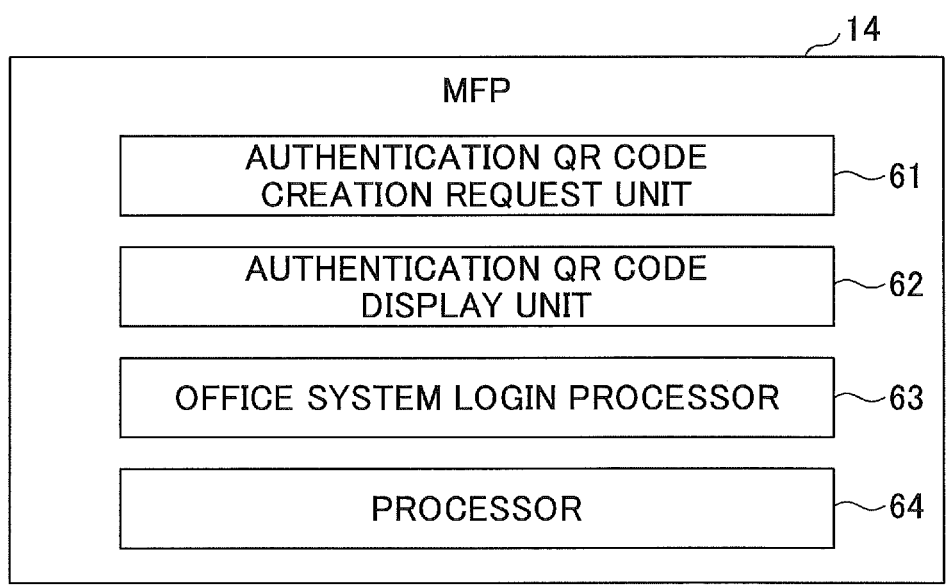
FIG. 7 is a diagram showing an example of processing blocks of the MFP according to the embodiment.

The MFP 14 according to the embodiment can be achieved by processing blocks that are shown in FIG. 7, for example. FIG. 7 is a diagram showing an example of the processing blocks of the MFP 14 according to the embodiment. An authentication QR code creation request unit 61 can transmit a request for creation of the authentication QR code, which is described below, to the information storage device 10. An authentication QR code display unit 62 can display the authentication QR code that is received from the information storage device 10.

An office system login processor 63 can receive a request for logging in to the office system from a user, and the office system login processor 63 can execute a process of logging in to the office system. A processor 64 can receive, through the relay server 19 and the information storage device 10, a request for processing for which the access data is used. Then, the processor 64 can execute a process corresponding to the request for processing.

<Details of the Process>

Hereinafter, details of an example of a process by the cooperative processing system 1 according to the embodiment are explained.

<<Authentication Process>>

Figure 8:
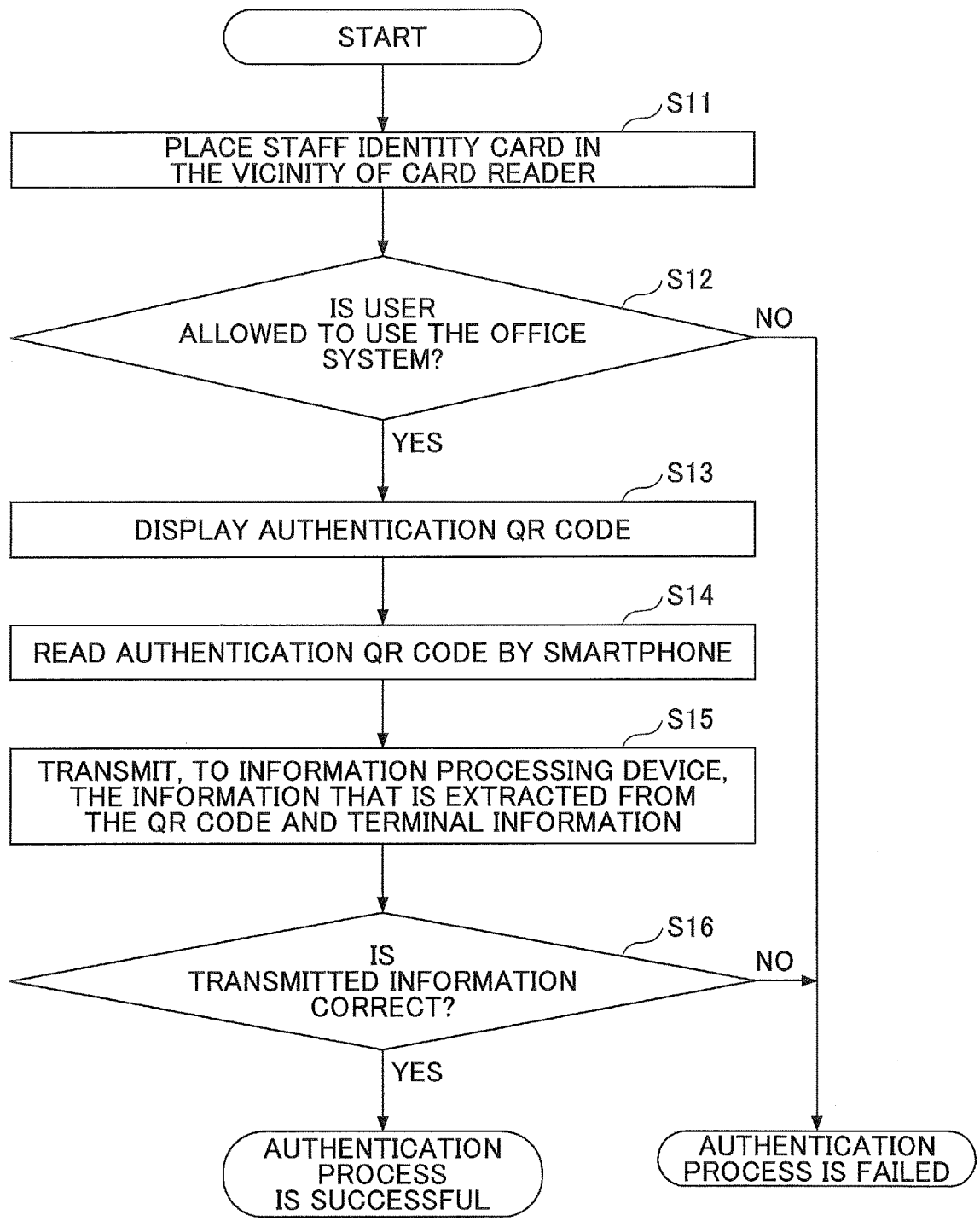
FIG. 8 is a flowchart illustrating an example of an authentication process that is to be executed by the cooperative processing system.

As shown in FIG. 8, in the cooperative processing system 1 according to the embodiment, the smartphone 1 can be authenticated, for example. FIG. 8 is a flowchart illustrating an example of an authentication process that is to be executed in the cooperative processing system 1. In the flowchart of FIG. 8, an example is illustrated such that a staff identity card is placed in the vicinity of the card reader 15, and thereby a determination is made as to whether the user can use the office system.

Note that the authentication method, by using the staff identity card, of determining whether the user can use the office system is for exemplifying purpose only. Another authentication method can be used for determining whether the user can use the office system. For example, as another other authentication method, a biometric authentication method, and an authentication method by inputting use's identification information (e.g., employee ID) and a password can be considered.

At step S11, the user places the staff identity card in the vicinity of the card reader 15. The card reader 15 retrieves authentication information of the user from the staff identity card, and the card reader 15 provides the retrieved authentication information of the user to the office system login processor 63 of the MFP 14. The authentication information of the user is information for logging in to the office system.

The authentication information of the user can be an office system login user name and an office system login password, for example.

At step S12, the office system login processor 63 of the MFP 14 determines whether the user is allowed to use the office system by using the authentication information of the user that is provided by the card reader 15. Upon determining that the user is disallowed to use the office system, the office system login processor 63 determines that the authentication process is failed.

In contrast, upon determining that the user is allowed to use the office system, the process proceeds to step S13. At step S13, the authentication QR code creation request unit 61 requests the information storage device 10 to create an authentication QR code, and the authentication QR code creation request unit 61 receives the authentication QR code from the information storage device 10. The authentication QR code display unit 62 displays the received authentication QR code on the operations panel 702.

At step S14, by using a camera function of the smartphone 11, the user takes a photograph of the authentication QR code that is displayed on the operations panel 702 of the MFP 14. The authentication QR code reading unit 51 of the smartphone 11 reads the authentication QR code that is displayed on the operations panel 702. The authentication QR code analyzer 52 analyzes the read authentication QR code, and the authentication QR code analyzer 52 retrieves information that is embedded in the authentication QR code, such as shown in FIG. 9.

FIG. 9 is a diagram showing an example of a configuration of information that is embedded in a quick response (QR) code for authentication. In FIG. 9, as an example of the information that is embedded in a QR code for authentication, a relay server host name, information storage device identification (ID), and a one-time password are shown.

The relay server host name can be a host name of the relay server 19 that is for relaying communication to the information storage device 10. The information storage device identification (ID) can be identification information for identifying the information storage device 10 by the relay server 19. The one-time password can be information for determining, by the information storage device 10, validity of authentication data from the smartphone 11.

At step S15, the access data retrieval unit 53 creates authentication data, such as shown in FIG. 10, by using the information that is embedded in the authentication QR code, such as shown in FIG. 9, and terminal ID of the smartphone 11. Then, the access data retrieval unit 53 transmits the authentication data to the information storage device 10 through the relay server 19.

FIG. 10 is a diagram showing an example of a configuration of the authentication data that is to be transmitted from the smartphone 11 to the information storage device 10. In FIG. 10, the one-time password, the information storage device ID and the terminal ID are shown as an example of authentication data that is to be transmitted from the smartphone 11 to the information storage device 10. The one-time password and the information storage device ID can be the information that is embedded in the authentication QR code. The terminal ID can be identification information for the information storage device 10 to identify the smartphone 11.

At step S16, the information storage device 10 determines whether the authentication data (cf. FIG. 10, for example) that is transmitted from the smartphone 11 is correct or not. Upon determining that the authentication data that is received from the smartphone 11 is correct, the information storage device 10 determines that the authentication process is successful. Then, the information storage device 10 creates access data, which is described below, and the information storage device 10 returns the access data to the smartphone 11. Note that the information storage device 10 associates the access data, which is described below, with information for logging in to the office system, and the information storage device 10 stores the access data and the information for logging in to the office system that are associated. Upon determining that the authentication data that is received from the smartphone 11 is incorrect, the information storage device 10 determines that the authentication process is failed.

In FIG. 8, the example is shown such that, by using the authentication QR code, the information, such as shown in FIG. 9, is provided to the smartphone 11. However, instead of the authentication QR code, the information, such as shown in FIG. 9, can be provided by using a short range radio communication standard, such as Bluetooth (registered trademark) or NFC, or by using an electronic mail. As described above, the cooperative processing system 1 according to the embodiment is not limited to the example in which the authentication QR code is used.

Figure 11:
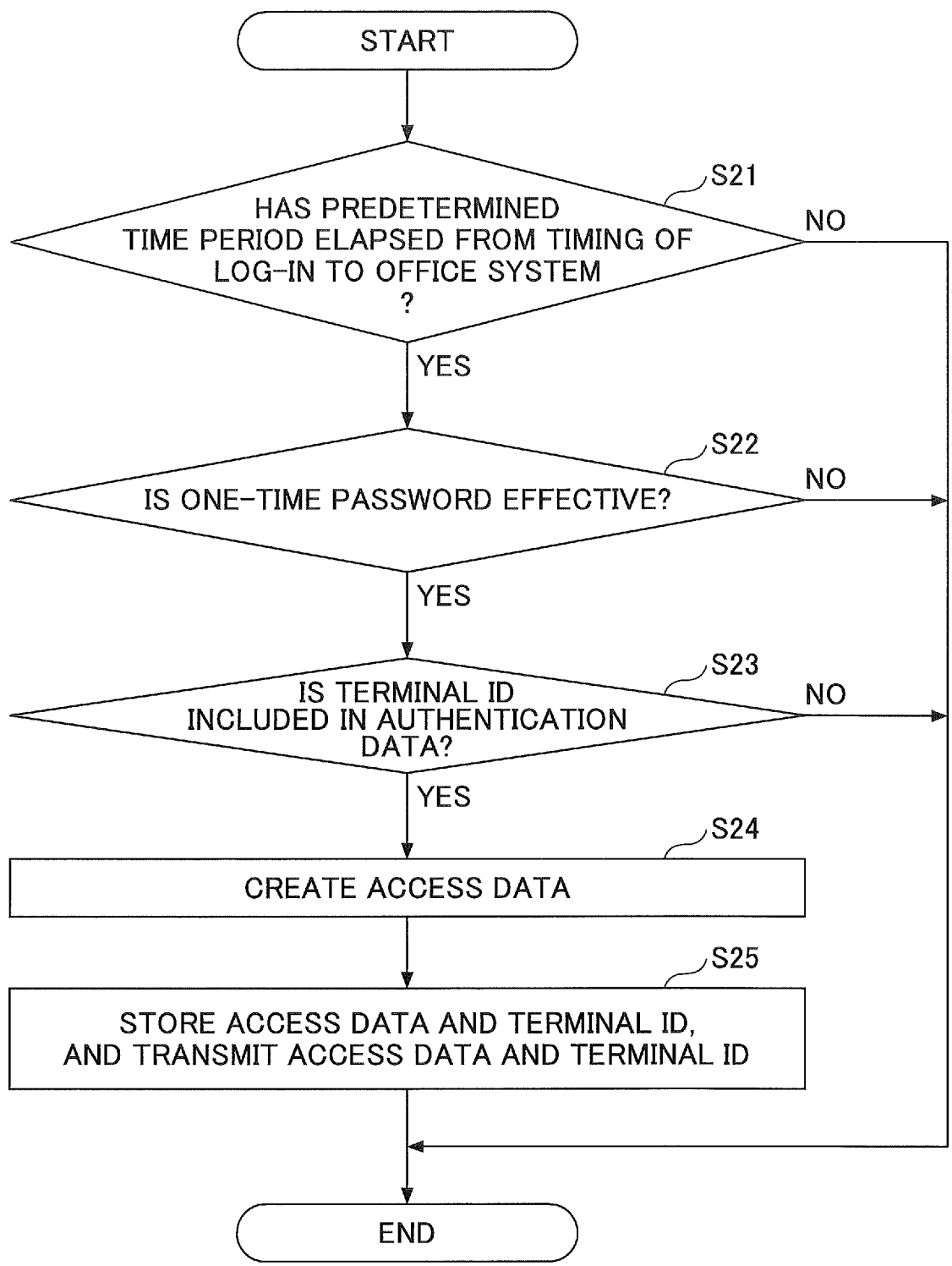
FIG. 11 is a flowchart illustrating an example of a process of determining whether the authentication data is correct.

Further, at step S16 of FIG. 8, the information storage device 10 determines whether the authentication data is correct or not by a process, such as shown in FIG. 11. FIG. 11 is a flowchart illustrating an example of the process of determining whether the authentication data is correct or not.

At step S21, the information storage device 10 detects elapsed time from timing of the login to the office system that is executed at step S12 of FIG. 8, and the information storage device 10 determines whether a predetermined time period has elapsed from the timing of the login to the office system. Here, the elapsed time from the timing of the login to the office system may be reported to the information storage device 10, for example, at a moment of requesting the information storage device 10 to create the authentication QR code at step S13.

Upon determining that the predetermined time period has not elapse from the timing of the login to the office system, subsequently the information storage device 10 determines, at step S22, whether the one-time password that is included in the authentication data is effective or not Note that the information storage device 10 stores, at step S13, the one-time password that is embedded in the authentication QR code. Upon determining that a predetermined time period has elapsed from the timing of creation of the one-time password, or upon determining that the one-time password is used, the information storage device 10 may delete the stored one-time password.

The determination as to whether the one-time password is effective can be made by determining whether a one-time password that is the same as the one-time password that is included in the authentication data is stored in the information storage device 10.

After determining that the one-time password is effective, the information storage device 10 determines, at step S23, whether the terminal ID is included in the authentication data. In response to determining that the terminal ID is included in the authentication data, the information storage device 10 creates, at step S24, a temporary access user name and a temporary access password as temporary access data.

The process proceeds to step S25. At step S25, the information storage device 10 stores the temporary access data as shown in FIG. 12. FIG. 12 is a diagram showing an example of a configuration of the temporary access data that is to be stored in the information storage device 10. In FIG. 12, the temporary access user name and the temporary access password that are the temporary access data, the terminal ID, a term of validity of the temporary access data, an office system log-in user name, and an office system log-in password are associated. The associated data can be stored in the information storage device 10.

After storing the temporary access data as shown in FIG. 12, the information storage device 10 transmits the temporary access data to the smartphone 11. By storing the temporary access data as shown in FIG. 12, the information storage device 10 can identify a user by using the office system log-in user name and the office system log-in password.

Note that the process of FIG. 11 can be terminated in response to determining that the predetermined time period has elapsed from the timing of the log-in to the office system at step S21 of FIG. 11; in response to determining that the one-time password is not effective at step S22 of FIG. 11; or in response to determining that the terminal ID is not included in the authentication data at step S23 of FIG. 11.

Figure 13:
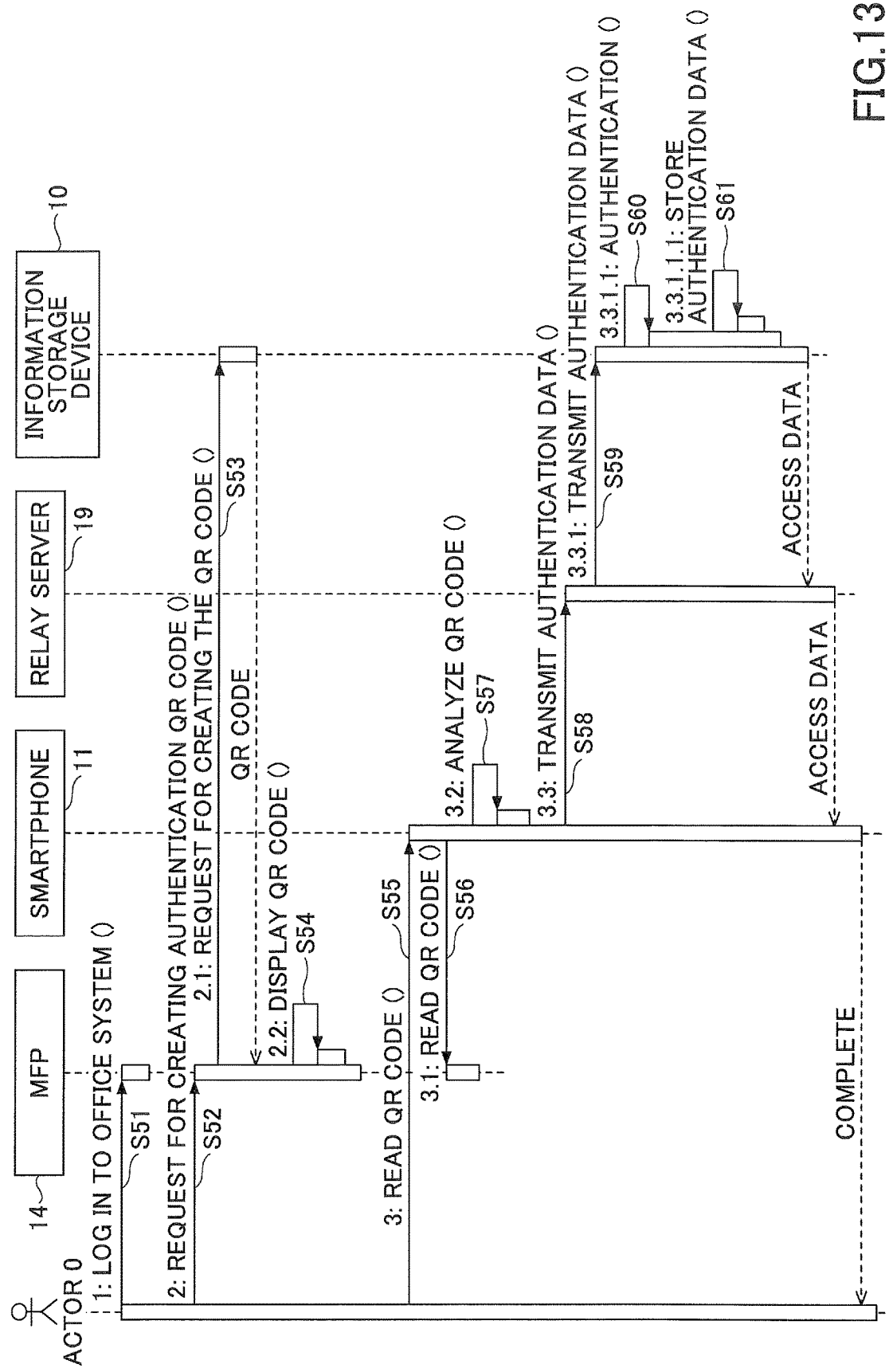
FIG. 13 is a sequence diagram illustrating an example of the authentication process that is to be executed by the cooperative processing system.

The above-described authentication process that can be executed by the cooperative processing system 1 according to the embodiment can be represented by a sequence diagram as shown in FIG. 13. FIG. 13 is a sequence diagram illustrating an example of the authentication process that is to be executed by the cooperative processing system 1.

At step S51, a user logs in to the office system so as to use the MFP 14. Upon completing the log-in to the office system, the user requests the MFP 14 to create the authentication QR code through the operations panel 702 of the MFP 14.

At step S53, the authentication QR code creation request unit 61 of the MFP 14 requests the information storage device 10 to create the authentication QR code. At this time, the authentication QR code creation request unit 61 transmits, to the information storage device 10, the time of logging in to the office system; and the office system log-in user name and the office system log-in password that are used for logging in to the office system.

In response to receiving the request for creation of the authentication QR code, the information storage device 10 creates the one-time password, and the information storage device 10 stores the one-time password, so that the one-time password can be deleted after the predetermined time period has elapsed. Then, the information storage device 10 creates the authentication QR code in which the relay server host name, the information storage device ID, and the one-time password are embedded, and the information storage device 10 transmits the authentication QR code to the MFP 14. At step S54, the authentication QR code display unit 62 of the MFP 14 displays the authentication QR code that is received from the information storage device 10 on the operations panel 702.

At step S55, the user takes a photograph of the authentication QR code that is displayed on the operations panel 702 of the MFP 14 by using the camera function of the smartphone 11. At step S56, the authentication QR code reading unit 51 of the smartphone 11 reads the authentication QR code that is displayed on the operations panel 702. At step S57, the authentication QR code analyzer 52 analyzes the read authentication QR code, and the authentication QR code analyzer 52 retrieves the information, such as shown in FIG. 9, that is embedded in the authentication QR code.

At step S58, the access data retrieval unit 53 of the smartphone 11 creates the authentication data, such as shown in FIG. 10. The authentication data includes the information storage device ID and the one-time password that are retrieved from the authentication QR code; and the terminal ID of the smartphone 11. The access data retrieval unit 53 transmits the generated authentication data to the relay server 19 that is identified by the relay server host name. The relay server host name is retrieved from the authentication QR code.

At step S59, the authentication data from the smartphone 11 is transmitted to the information storage device 10 through the relay server 19. At step S60, the information storage device 10 determines whether the received authentication data, which is shown in FIG. 10, is correct of not.

The information storage device 10 determines whether the authentication data is correct or not, for example, by the process that is shown in FIG. 11. In response to determining that the authentication data that is received from the smartphone 11 is correct, the information storage device 10 determines that the authentication process is successful. Then, the information storage device 10 creates the temporary access user name and the temporary access password as the temporary access data.

The process proceeds to step S61. The information storage device 10 associates the temporary access data with the terminal ID, the term of validity of the temporary access data, the office system log-in user name, and the office system log-in password. Then, the information storage device 10 stores the associated data as shown in FIG. 12.

After storing the temporary access data as shown in FIG. 12, the information storage device 10 transmits the temporary access data to the smartphone 11. The smartphone 11 stores the received temporary access data. Then, the process of FIG. 13 is terminated.

<<Request for Processing>>

After storing the temporary access data, the smartphone 11 is allowed, by using the temporary access data, to transmit a request for processing to an electronic device, such as the MFP 14, through the relay server 19 and the information storage device 10.

Figure 14:
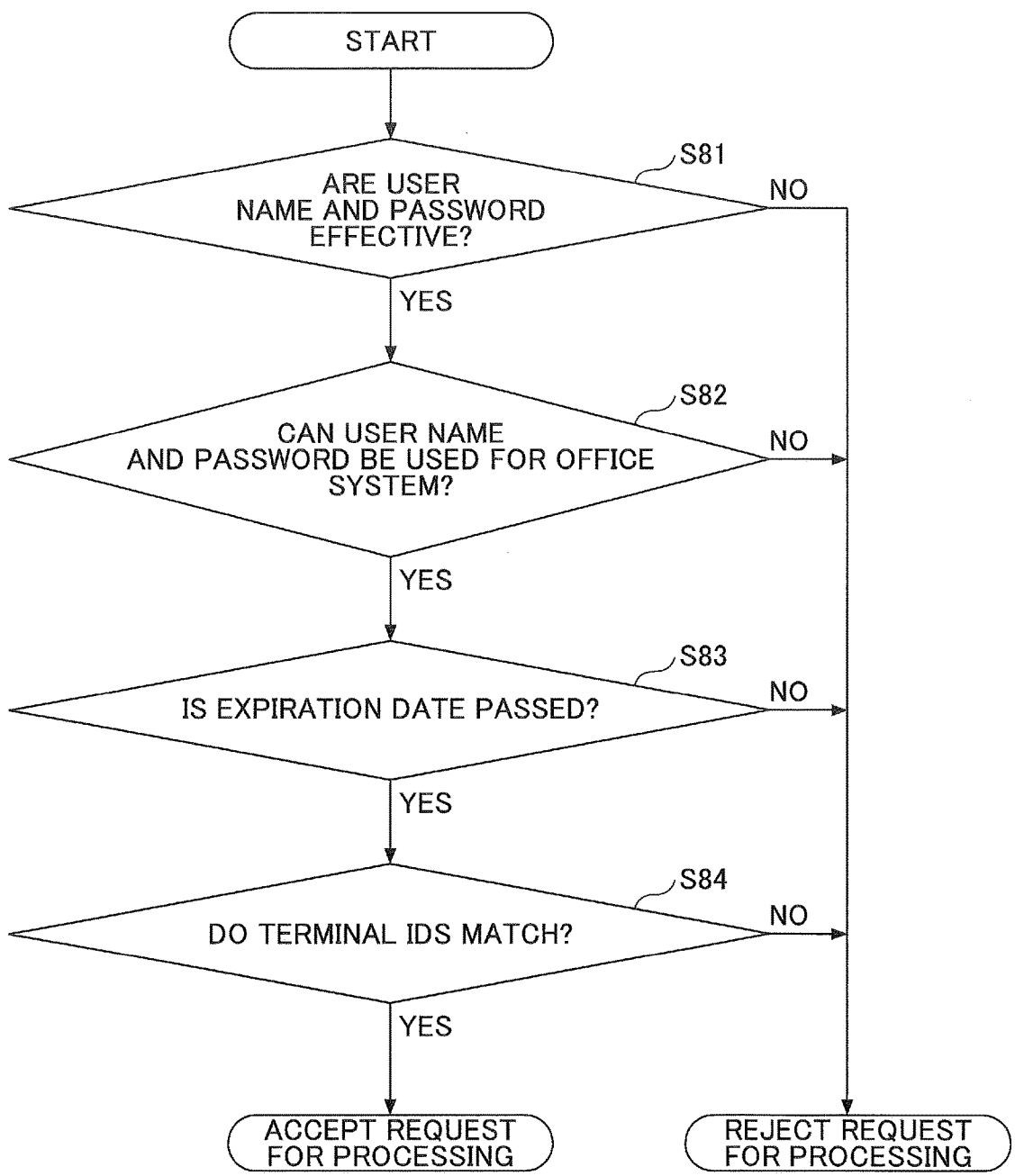
FIG. 14 is a flowchart illustrating an example of a process of determining whether a request for processing is accepted or rejected.

After receiving the request for processing that is made by using the temporary access data, the information storage device 10 determines whether the request for processing is to be accepted or rejected by the process that is shown in FIG. 14. FIG. 14 is a flowchart illustrating an example of the process of determining whether the request for processing is accepted or rejected.

At step S81, the information storage device 10 determines whether the temporary access user name and the temporary access password that are received as the temporary access data are stored as shown in FIG. 12.

In response to determining that the temporary access user name and the temporary access password that are received as the temporary access data are stored in the information storage device 10 as shown in FIG. 12, the information storage device 10 determines that the access data is effective. Then, the process proceeds to the process of step S82. In contrast, upon determining that the temporary access user name and the temporary access password that are received as the temporary access data are not stored in the information storage device 10 as shown in FIG. 12, the information storage device 10 determines that the temporary access data is not effective. Then, the information storage device 10 rejects the request for processing.

At step S82, the information storage device 10 refers to the information that is shown in FIG. 12, and the information storage device 10 retrieves the office system log-in user name and the office system log-in password that are associated with the temporary access data that is determined to be effective and that are stored in the information storage device 10. Then, the information storage device 10 determines whether the office system log-in user name and the office system log-in password that are retrieved by the information storage device 10 can be used or not.

In response to determining that the retrieved office system log-in user name and the retrieved office system log-in password can be used, the process of the information storage device 10 proceeds to step S83. Whereas, in response to determining that the retrieved office system log-in user name and the retrieved office system log-in password may not be used, the information storage device 10 rejects the request for processing.

At step S83, the information storage device 10 refers to the information of FIG. 12, and the information storage device 10 retrieves the term of validity. Here, the term of validity is associated with the access data that is determined to be effective, and the term of validity is stored in the information storage device 10. Then, the information storage device 10 determines whether the term of validity is passed.

In response to determining that the term of validity is not passed, the process of the information storage device 10 proceeds to step S84. Whereas, in response to determining that the term of validity is passed, the information storage device 10 rejects the request for processing.

At step S84, the information storage device 10 refers to the information of FIG. 12, and the information storage device 10 retrieves the terminal ID. Here, the terminal ID is associated with the access data that is determined to be effective, and the terminal ID is stored in the information storage device 10. Then, the information storage device 10 determines whether the retrieved terminal ID matches with the terminal ID of the smartphone 11 that transmits the request for processing.

In response to determining that the retrieved terminal ID matches with the terminal ID of the smartphone 11 that transmits the request for processing, the information processing device 10 accepts the request for processing. Whereas, in response to determining that the retrieved terminal ID does not match with the terminal ID of the smartphone 11 that transmits the request for processing, the information processing device 10 rejects the request for processing.

Figure 15:
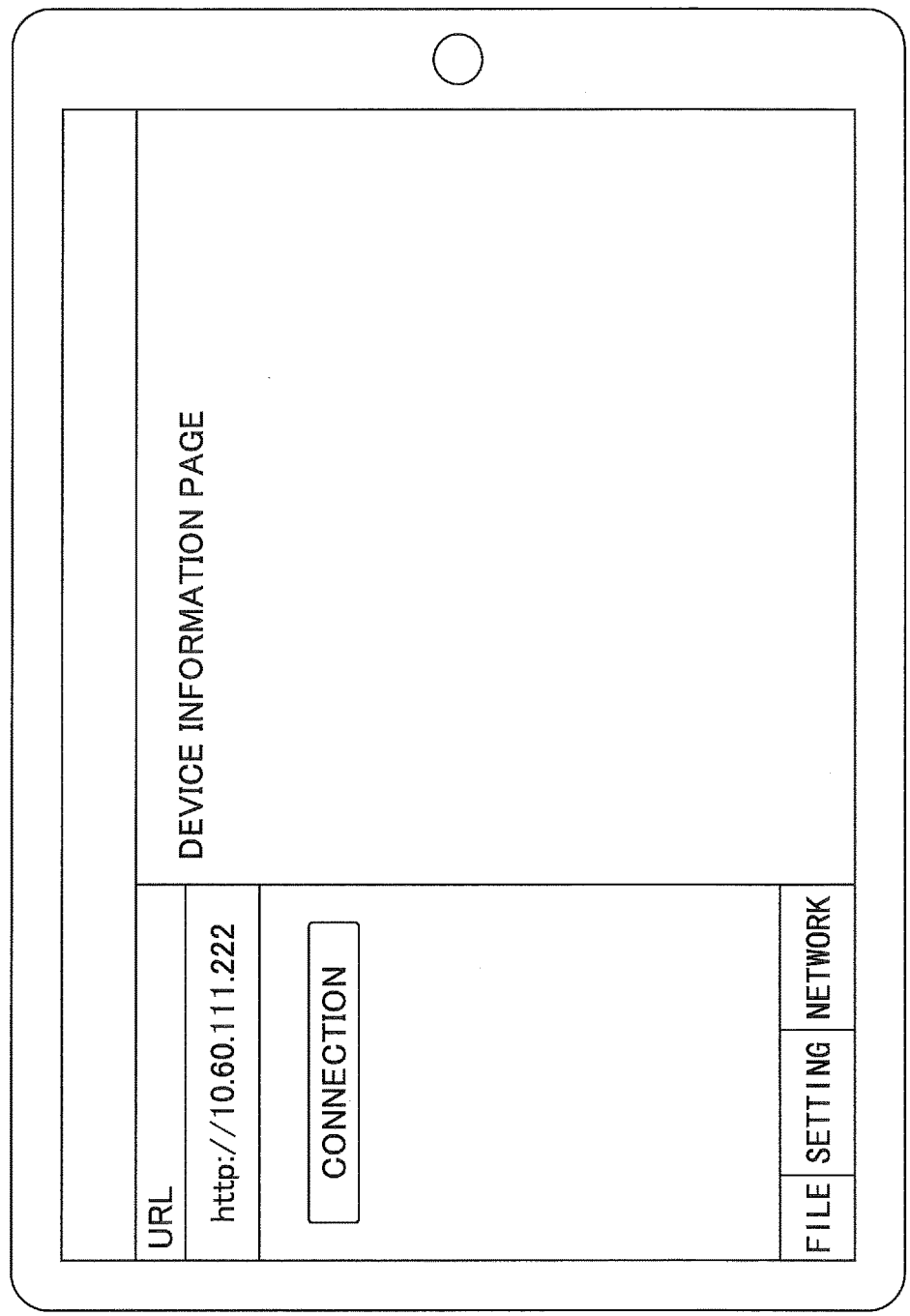
FIG. 15 is an image diagram showing an example of a device information page viewing screen.

When the request for processing is accepted by the information processing device 10, the smartphone 11 is allowed, by using the temporary access data, to request viewing of a device information page (cf. FIG. 15) from an electronic device, such as the MFP 14. FIG. 15 is an image diagram showing an example of a device information page viewing screen.

When a user of the smartphone 11 desires to use the MFP 14 that is connected to the network N3, the user can select the "NETWORK" button that is positioned at the lower left of the device information page viewing screen (cf. FIG. 15) that is displayed on the smart phone 11. In this manner, the user can cause the smartphone 11 to display a universal resource locator (URL) input field on the device information page viewing screen. The user can input a URL that is desired to be accessed (in the example of FIG. 15, http://10.60.111.222) into the URL input field. After that, the user can select the "CONNECTION" button. After successfully accessing the URL that is input into the URL input field, the smartphone 11 displays a content of the access destination on the right side of the device information page viewing screen of FIG. 15.

Figure 16:
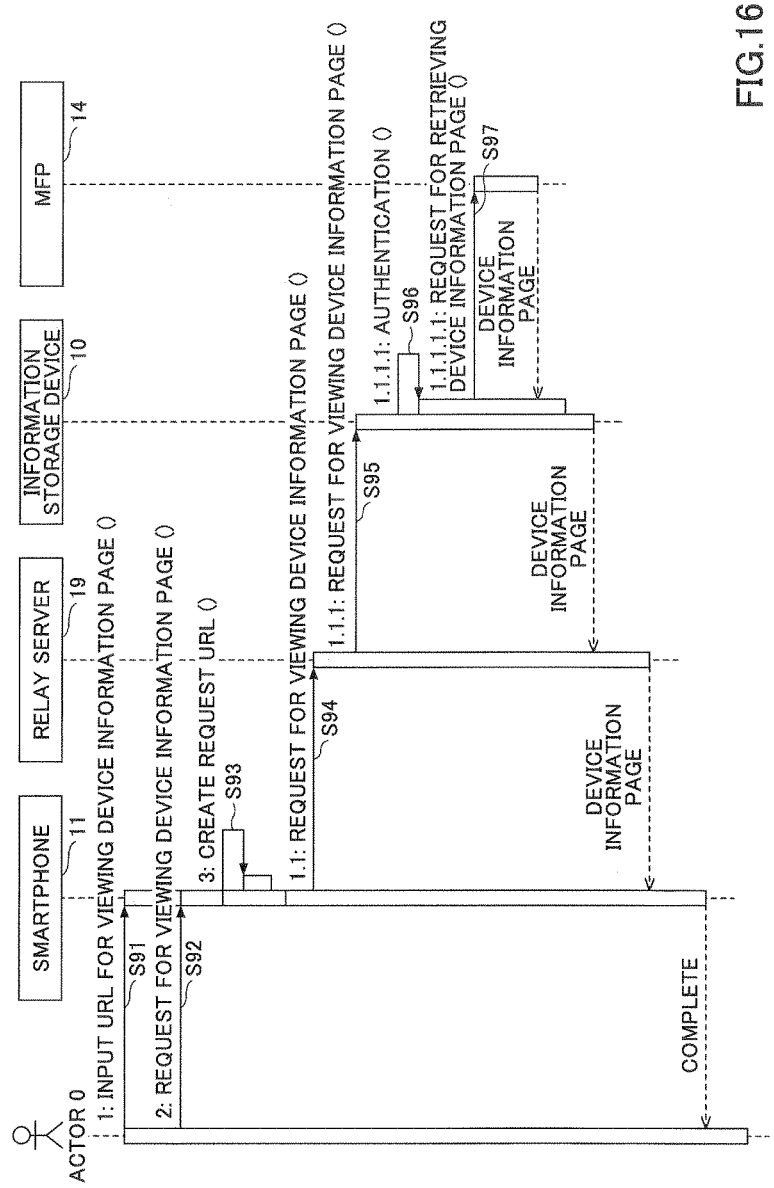
FIG. 16 is a sequence diagram illustrating an example of a process of viewing the device information page.

The process of accessing the MFP 14 by the smartphone 11 by using the temporary access data and viewing the device information page by using the smartphone 11 can be executed in accordance with the sequence diagram of FIG. 16, for example.

FIG. 16 is a sequence diagram illustrating an example of the process of viewing the device information page. At step S91, a user of the smartphone 11 inputs a URL that is desired to be accessed into the URL input field of the device information page viewing screen (cf. FIG. 15) that is displayed on the smartphone 11. At step S92, the user requests, by selecting the "CONNECTION" button, accessing the URL that is input into the URL input field.

At step S93, the processing request unit 54 of the smartphone 11 creates, from the URL that is input into the URL input field, a processing request URL (cf. FIG. 17) that can be parsed by the information storage device 10.

FIG. 17 is a diagram showing an example of a configuration of a processing request URL. The processing request URL of FIG. 17 is an example of a URL that is to be specified by the smartphone 11 for displaying the content of the access destination on the right side of the device information page viewing screen of FIG. 15. In the hostname part "test-server," the host name of the relay server 19 is specified. In the subsequent path part "connect," a path for using the MFP 14 is specified. In the subsequent query part "http://10.60.111.222," the URL that is to be accessed is specified. As described below, the information storage device 10 is to access the URL that is specified in the query part.

At step S94, the processing request unit 54 of the smartphone 11 transmits a device information page viewing request (cf. FIGS. 18A and 18B) that includes the access data, the information storage device ID, and the terminal ID to the processing request URL of FIG. 17.

FIGS. 18A and 18B are diagrams showing examples of a configuration of the access data, the information storage device ID, and the terminal ID that are included in a device information page viewing request. FIG. 18A shows a state, prior to applying the Base 64 encoding, of the temporary access user name and the temporary access password that are the access data. Actually, as shown in FIG. 18B, the Base 64 encoding is applied to the temporary access user name and the temporary access password that are the access data.

At step S95, the device information page viewing request is transmitted from the relay server 19 to the information storage device 10. After receiving, at step S96, the device information page viewing request, the information storage device 10 determines whether the device information page viewing request is to be accepted or rejected in accordance with the process that is shown in FIG. 14. In the following explanation, it is assumed that the device information page viewing request is accepted by the information storage device 10.

At step S97, the information storage device 10 retrieves the device information page (a content) from the MFP 14 by accessing the URL that is specified in the query part of the processing request URL (cf. FIG. 17), and the information storage device 10 transmits the retrieved device information page to the smartphone 11 through the relay server 19. The smartphone 11 can display the device information page (the content) that is received from the MFP 14.

Another Embodiment

An example of a process by cooperative processing system 1 according to another embodiment is described below in detail. In this embodiment, the electronic device (e.g., MFP 14) can generate the authentication QR code.

Figure 19:
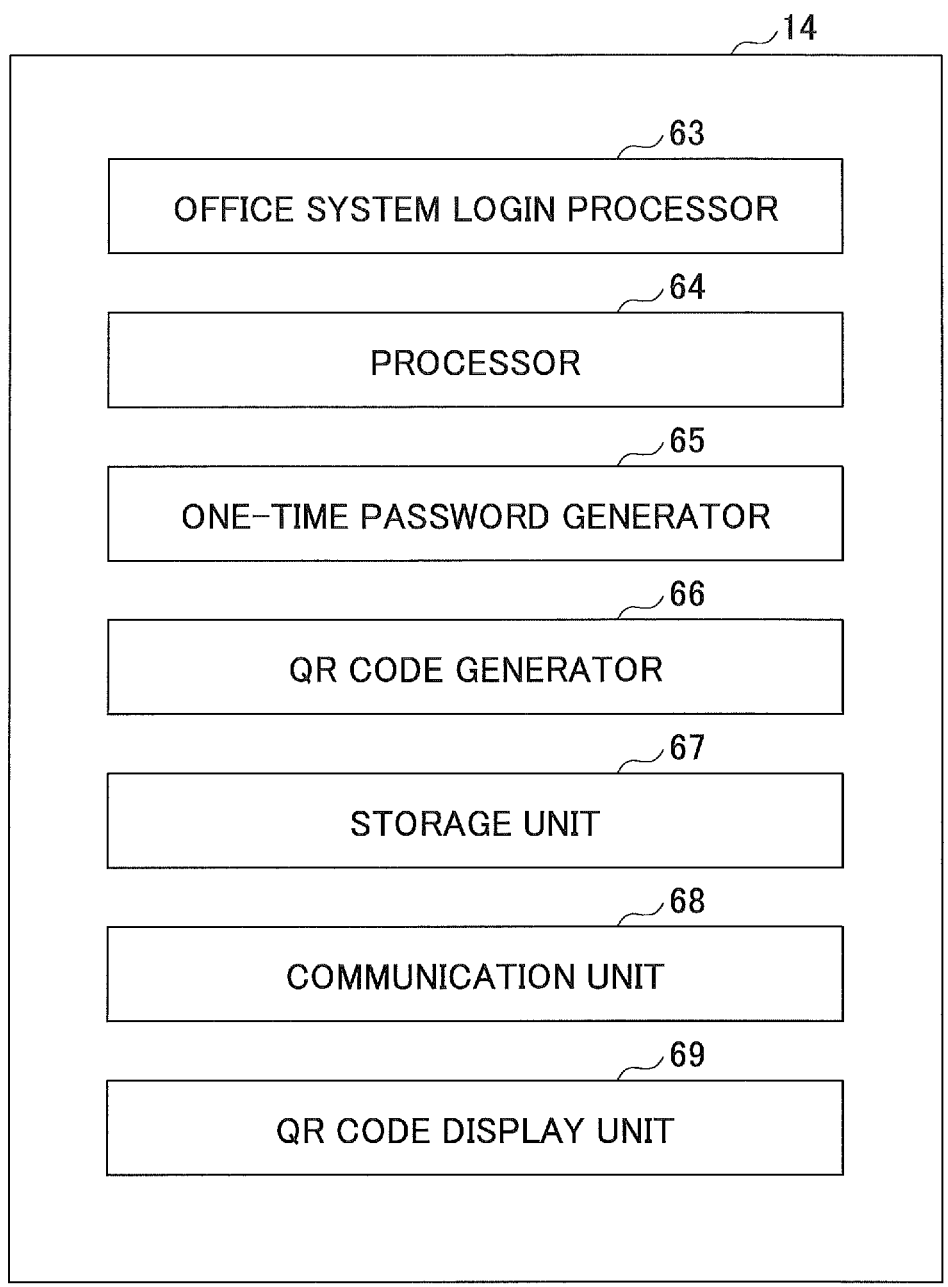
FIG. 19 is a diagram showing an example of processing blocks of the MFP according to the embodiment.

First, an example of processing blocks of the MFP 14 according to the embodiment is described. The MFP 14 according to the embodiment can be implemented by the processing blocks that are shown in FIG. 19. FIG. 19 is a diagram showing an example of the processing blocks of the MFP 14 according to the embodiment. The office system login processor 63 can receive a request for logging in to the office system from a user, and the office system login processor 63 can execute a process of logging in to the office system. The processor 64 can receive, through the relay server 19 and the information storage device 10, a request for processing for which the access data is used. Then, the processor 64 can execute a process corresponding to the request for processing. Here, the process can differ, depending on the device. For the MFP 14, the process can be a scanning process, a printing process, a facsimile transmission process, an e-mail transmission process, a process of storing data in the MFP 14, and so forth. For the projector 12, the process can be a data projecting process, a process of storing projected data, a process of transmitting the projected data, and so forth. For the IWB 13, the process can be, for example, a process of displaying data, a process of storing the displayed data, a process of transmitting the displayed data (e.g., transmission to another device, or transmission by e-mail), and so forth.

A one-time password generator 65 can generate a one-time password that is embedded in an authentication QR code. The one-time password can be used for authentication by the information storage device 10. A QR code generator 66 can generate an image of an authentication QR code in which the information that is shown in FIG. 9 can be embedded. The QR code generator 66 can also generate an image of an identification QR code in which information of the MFP 14, such as the device ID and the device type of the MFP 14, can be embedded. A storage unit 67 can store the device ID and the device type of the MFP 14; the information storage device ID; the relay server host name; and so forth. A communication unit 68 can communicate with another device (e.g., the information storage device 10). The communication unit 68 can transmit and receive information and/or data. A QR code display unit 69 can display a QR code that can be generated by the QR code generator 66.

Note that, as described above, the relay server host name and the information storage device ID may be stored, in advance, in the storage device 67. Alternatively or additionally, the QR code generator 66 may retrieve, during generation of the QR code by the QR code generator 66, the relay server host name and the information storage device ID from the information storage device 10.

Figure 20:
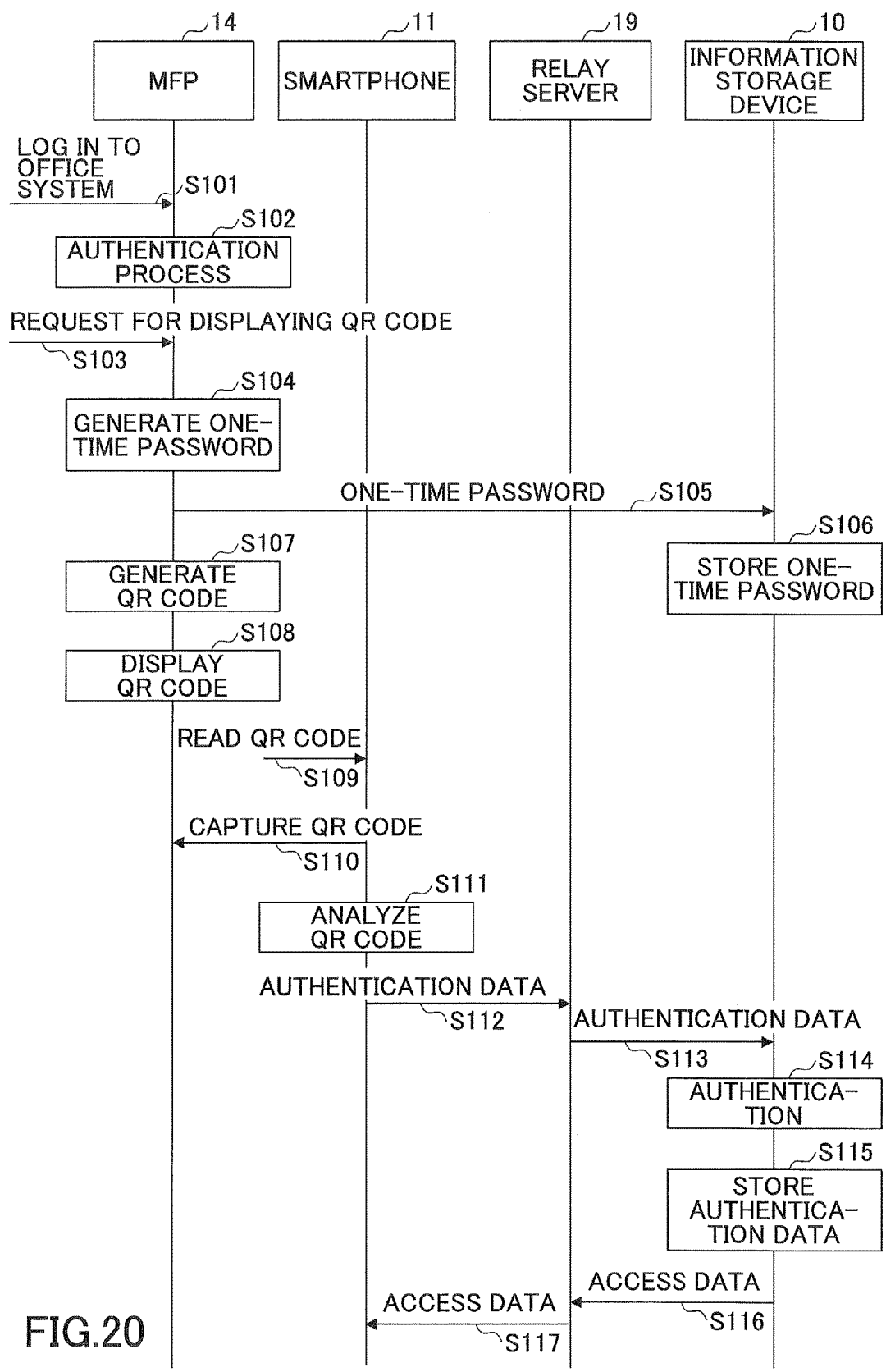
FIG. 20 is a sequence diagram illustrating an example of the authentication process according to the embodiment.

Next, details of the authentication process according to the embodiment are described. FIG. 20 is a sequence diagram illustrating an example of the authentication process according to the embodiment.

First, the MFP 14 receives a request for logging in to the office system from a user (step S101). Then, the MFP 14 executes a requested authentication process for logging in to the office system (step S102). Note that, in this authentication process, authentication may be made based on user data that is received by the office system login processor 63 of the MFP 14. Alternatively, this authentication process may be a process such that the office system login processor 63 of the MFP 14 transmits user data that is received during the login process to an authentication server (not shown) through the communication unit 68, and the office system login processor 63 receives a result of authentication by the authentication server. Then, the MFP 14 receives a request for displaying an authentication QR code from the user (step S103).

Upon receiving the request for displaying the authentication QR code, the one-time password generator 65 of the MFP 14 generates a one-time password (step S104). Then, the communication unit 68 of the MFP 14 transmits the generated one-time password to the information storage device 10 (step S105). At this time, the communication unit 68 transmits, to the information storage device 10, the time of logging in to the office system; and the office system log-in user name and the office system log-in password that are used for logging in to the office system. The information storage device 10 receives the one-time password; the time of logging in to the office system; the office system log-in user name; and the office system log-in password, which are transmitted from the MFP 14. The information storage device 10 stores the one-time password; the time of logging in to the office system; the office system log-in user name; and the office system log-in password, which are received (step S106). Note that the information storage device 10 stores the received one-time password in such a manner that the one-time password is deleted after a predetermined time elapses.

The authentication QR code creation request unit 61 of the MFP 14 generates the authentication QR code in which the information, such as shown in FIG. 9, that includes the one-time password that is generated at step S104 is embedded (step S107). Then, the QR code display unit 69 of the MFP 14 displays the generated authentication QR code on the operations panel 702 (step S108).

The user takes a photograph of the authentication QR code that is displayed on the operations panel 702 of the MFP 14 by using the camera function of the smartphone 11 (step S109). The authentication QR code reading unit 51 of the smartphone 11 reads the authentication QR code (which is included in the captured image) that is displayed on the operations panel 702 (step S110). The authentication QR code analyzer 52 analyzes the read authentication QR code, and the authentication QR code analyzer 52 retrieves the information, such as shown in FIG. 9, that is embedded in the authentication QR code (step S111).

The process from step S112 to step S117 is the same as the process that is described for step S58 to step S61 and for transmission of the access data in FIG. 13. Thus, the description of the process from step S112 to step S117 is omitted.

Figure 21:
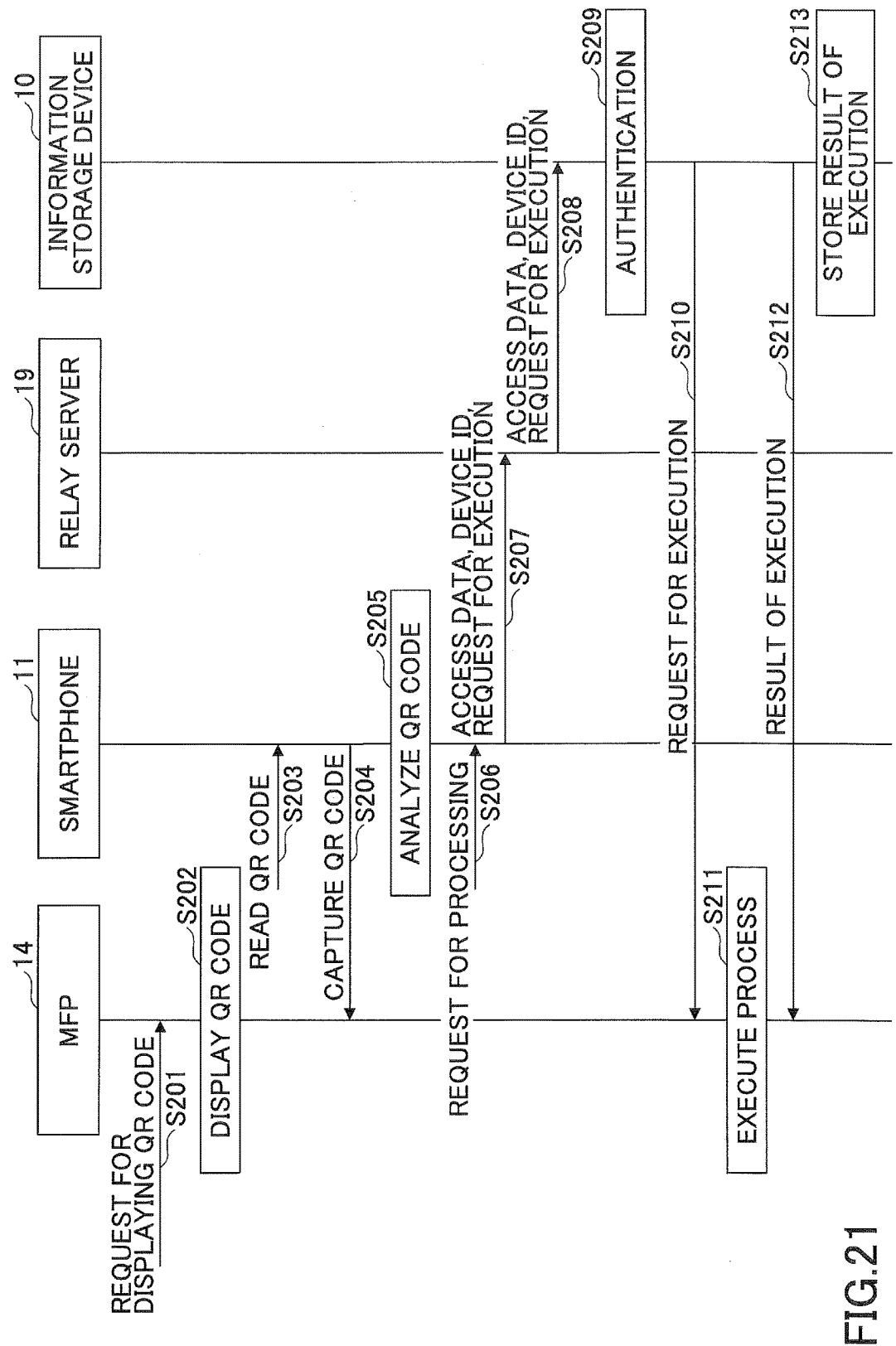
FIG. 21 is a sequence diagram illustrating an example of a sequence of processes for requesting execution of a process.

Next, an example of a process is described in which the electronic device according to the embodiment is requested to execute a process. FIG. 21 is a sequence diagram illustrating an example of a sequence of processes for requesting execution of the process. In FIG. 21, an example is described in which the MFP 14 is requested to execute a process.

First, the MFP 14 receives a request for displaying an identification QR code from a user (step S201). Upon receiving the request for displaying the identification QR code, the QR code generator 66 of the MFP 14 generates the identification QR code in which the information, such as shown in FIG. 22, is embedded. The QR code display unit 69 of the MFP 14 displays the generated identification QR code on the operations panel 702 (step S202). FIG. 22 is a diagram showing an example of information that is embedded in the identification QR code. As shown in FIG. 22, the identification QR code may include a device ID for identifying a device (e.g., a serial number and a network address); a device type (e.g., information that indicates a type of the device, such as the MFP or the projector, and information that indicates a process that can be executed by the device, such as scanning, facsimile transmission, and printing); and so forth.

Note that the identification QR code may be generated by the QR code generator 66 of the MFP 14, upon receiving the request for displaying. Additionally or alternatively, the identification QR code may be generated by the QR code generator 66 of the MFP 14 in advance, and the generated identification QR code may be stored in the storage unit 67. Alternatively, the MFP 14 may not generate the identification QR code. In this case, the MFP 14 may store the identification QR code that is generated by another device (e.g, the information storage device 10) in the storage unit 67.

The user takes a photograph of the identification QR code that is displayed on the operations panel 702 of the MFP 14 by using the camera function of the smartphone 11 (step S203). The authentication QR code reading unit 51 of the smartphone 11 reads the identification QR code (which is included in the captured image) that is displayed on the operations panel 702 (step S204). Here, instead of displaying the identification QR code, for example, the identification QR code in which the information, such as shown in FIG. 22, is embedded may be attached to the electronic device, so that the user can take a photograph of the attached identification QR code by using the smartphone 11.

The smartphone 11 analyzes the identification QR code that is included in the captured image, and thereby the smartphone 11 retrieves the device ID and the device type (step S205). Then, the smartphone 11 receives the request for the process that is to be executed by the MFP 14 (step S206). Here, the processes that can be selected by the user may be changed, depending on the retrieved device type, for example. For example, when the retrieved device type is the MFP 14, an arrangement may be made so that the user can select one of a scanning process, a facsimile transmission process, a printing process, and an e-mail transmission process. When the device type is the projector 12, an arrangement may be made so that the user can select one of a process of projecting data, a process of storing the projected data, and a process of transmitting the projected data. Furthermore, when the process is a process in which a file that is stored in the information storage device 10 is used (e.g., a process of printing a file that is stored in the information storage device 10 by the MFP 14), a list of files may be retrieved from the information storage device 10, and the list of the file may be displayed so that one of the files may be selected.

Upon receiving the request for processing from the user, the smartphone 11 transmits, to the information storage device 10, the received request for processing, the access data that is received at step S117 of FIG. 20, the device ID that is retrieved by analyzing the captured identification QR code, and so forth, through the relay server 19 (step S207 to step S208).

The information storage device 10 executes an authentication process by comparing the received access data with the stored access data (step S209). For this authentication process, the process that is shown in FIG. 14 is executed. Then, upon determining that the request for executing the process is to be accepted, the information storage device 10 requests the MFP 14 to execute the process based on the received request for processing (step S210)). For example, if the requested process is a process, by the MFP 14, of printing a file that is stored in the information storage device 10, the information storage device 10 identifies the file to be printed, and the information storage device 10 converts the identified file into a file in a format that can be printed by the MFP 14 that is identified by the device ID. The information storage device 10 transmits a printing request for printing the converted file to the MFP 14 that is identified by the device ID.

The processor 64 of the MFP 14 executes a process in accordance with the received request for processing (step S211). Then, the communication unit 68 of the MFP 14 transmits a result of the process that is executed by the MFP 14 to the information storage device 10 (step S212). The information storage device 10 stores the result of the process that is received from the MFP 14 (step S213).

Note that, in the process from step S207 to step S208, the information storage device 10 may also receive, from the smartphone 11, location information of the smartphone 11. In this case, the information storage device 10 may store the information, such as shown in FIG. 23, at step S213. FIG. 23 is a diagram showing an example of the information that can be stored in the information storage device 10. The information storage device 10 may associate the date and time of receiving the request for processing, the type of the process that is requested to be executed (operation details), the location information of the smartphone 11 (latitude/longitude), the user ID of the user who requests execution of the process, the name of the file that is used for the process, the result of the process, and so forth, and the information storage device 10 may store the associated data.

By storing the information that is shown in FIG. 23, it is possible to identify which process is executed from which location by the user who accesses the information storage device 10 through the relay server 19. Thus, security of the information storage device 10 can be enhanced, and the management of the information storage device 10 can be facilitated.

CONCLUSION

As described above, in the cooperative processing system 1 according to the embodiment, an electronic device can be controlled by the smartphone 11 through the network N1 (e.g., a telephone line), even if the smartphone 11 is unable to be connected to the network N3 (e.g., an intranet) to which the electronic device (e.g., the projector 12) is connected.

For example, the cooperative processing system 1 can be used for controlling an electronic device by using a user's private terminal device. Namely, it may not be possible to register the user's private terminal device, in advance, to the network N3 to which the electronic device is connected, or it may not be desirable to register the user's private terminal device to the network N3.

The image processing system, and the device control method are explained above by the embodiment. However, the present invention is not limited to the embodiment, and various modifications and improvements may be made within the scope of the present invention. Specific examples of numerical values are used in order to facilitate understanding of the invention. However, these numerical values are simply illustrative, and any other appropriate values may be used, except as indicated otherwise. The separations of the items in the above-described explanation are not essential to the present invention. Depending on necessity, subject matter described in two or more items may be combined and used, and subject matter described in an item may be applied to subject matter described in another item (provided that they do not contradict). A boundary of a functional unit or a processing unit in a functional block does not necessarily correspond to a boundary of a physical component. An operation by a plurality of functional units may be physically executed by a single component. Alternatively, an operation by a single functional unit may be physically executed by a plurality of components. For the convenience of explanation, the devices according to the embodiment of the present invention are explained by using the functional block diagrams. However, these devices may be implemented in hardware, software, or combinations thereof. The software that operates in accordance with the present invention may be prepared in any appropriate storage medium, such as a random access memory (RAM), a flash memory, a read-only memory (ROM), an EPROM, an EEPROM, a register, a hard disk drive (HDD), a removable disk, a CD-ROM, a database, a server, and the like.

The present invention can be implemented in any convenient form, for example using dedicated hardware, or a mixture of dedicated hardware and software. The present invention may be implemented as computer software implemented by one or more network processing apparatuses. The network can comprise any conventional terrestrial or wireless communications network, such as the Internet. The processing apparatuses can compromise any suitable programmed apparatuses such as a general-purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, a hard disk, a CD ROM, a magnetic tape device or a solid state memory device. The hardware platform includes any desired hardware resources including, for example, a central processing unit (CPU), a random access memory (RAM), and a hard disk drive (HDD). The CPU may include processors of any desired kinds and numbers. The RAM may include any desired volatile or nonvolatile memories. The HDD may include any desired nonvolatile memories capable of recording a large amount of data. The hardware resources may further include an input device, an output device, and a network device in accordance with the type of the apparatus. The HDD may be provided external to the apparatus as long as the HDD is accessible from the apparatus. In this case, the CPU, for example, the cache memory of the CPU, and the RAM may operate as a physical memory or a primary memory of the apparatus, while the HDD may operate as a secondary memory of the apparatus.

A first network described in the claims may correspond to the network N1. A second network may correspond to the network N3. A terminal device may correspond to the smartphone 11. An information processing device may correspond to the information storage device 10. An information processing system may correspond to the cooperative processing system 1. An electronic device may correspond to the MFP 14 or the like. In the above-described embodiment, the MFP 14 is considered as the example. However, the embodiment is not limited to this, and the MFP 14 may be replaced with the projector 12, the IWB 13, and so forth.

Furthermore, the authentication QR code reading unit 51 and the authentication QR code analyzer 52 may correspond to an information retrieval unit. The access data retrieval unit 53 may correspond to an access data retrieval unit. The processing request unit 54 may correspond to a processing request unit. The information storage device 10 that executes the process of step S53 may correspond to an information providing unit. The information storage device 10 that executes the process of steps S59 to S61 may correspond to an access data providing unit. The information storage device 10 that executes the process of steps S95 to S97 may correspond to a processing request transmission determining unit. The office system login processor 63 may correspond to an authentication processing unit. The authentication QR code creation request unit 61 and the authentication QR code display unit 62 may correspond to an information holding unit. The QR code can be an example of code information. The one-time password may be an example of first authentication information. The office system log-in user name and the office system log-in password may be an example of second authentication information.

The present application is based on and claims the benefit of priority of Japanese Priority Application No. 2014-211051 filed on Oct. 15, 2014, and Japanese Priority Application No. 2015-196594 filed on Oct. 2, 2015, the entire contents of which are hereby incorporated herein by reference.

What is claimed is:

1. An information processing system comprising:
a terminal device that is connected to a first network; and
an information processing device that is connected to a second network, the second network being different from the first network,
wherein the terminal device includes a first processor and a memory that includes instructions, which when executed, cause the first processor to execute the following steps:
retrieving, from an electronic device in which a user is successfully authenticated, identification information of the information processing device and first authentication information that is held by the information processing device;
retrieving access data from the information processing device by transmitting, to the information processing device that is identified by the identification information of the information processing device, an access data retrieval request that includes the first authentication information and identification information of the terminal device; and
transmitting a request for processing to the electronic device that is connected to the second network by using the access data, and
wherein the information processing device includes a second processor and a memory that includes instructions, which when executed, cause the second processor to execute the following steps:
providing, to the electronic device in which the user is successfully authenticated, the identification information of the information processing device and the first authentication information that is held by the information processing device;
providing, to the terminal device, the access data that is associated with the identification information of the terminal device, the identification information of the terminal device being included in the access data retrieval request, upon receiving the access data retrieval request that includes the first authentication information and the identification of the terminal device and determining that the information processing device holds the first authentication information that is identical to the first authentication information that is included in the access data retrieval request; and
transmitting, upon receiving the request for processing that is transmitted, by using the access data, from the terminal device to the electronic device that is connected to the second network and determining that the identification information of the terminal device that transmits the request for processing is identical to the identification information of the terminal device that is associated with the access data, the request for processing to the electronic device.

2. The information processing system according to claim 1,
wherein the steps executed by the first processor further includes:
providing, to the terminal device, the access data that is associated with the identification information of the terminal device, the identification information of the terminal device being included in the access data retrieval request, and a term of validity of the access data, and
wherein, in response to detecting that the term of validity of the access data is passed, the first processor deletes the access data.

3. The information processing system according to claim 1,
wherein the steps executed by the second processor further includes:
setting a term of validity of the first authentication information, and
wherein, in response to detecting that the term of validity of the first authentication information is passed, the second processor deletes the first authentication information.

4. The information processing system according to claim 1,
wherein the steps executed by the second processor further includes:
determining validity of second authentication information, wherein the second authentication information is associated with the identification information of the terminal device that is included in the access data retrieval request, the second authentication information is stored in the information processing device, and the second authentication information indicates that the user is successfully authenticated in the electronic device, and
wherein, in response to determining that the second authentication information is valid, the second processor transmits the request for processing to the electronic device.

5. The information processing system according to claim 1,
wherein the steps executed by the first processor further includes:
reading, from the electronic device in which the user is successfully authenticated, code information in which the identification information of the information processing device and the first authentication information that is held by the information processing device are embedded; and
extracting, from the code information that is read by the first processor, the identification information of the information processing device and the first authentication information that is held by the information processing device.

6. An information processing system comprising:
a terminal device that is connected to a first network;
an information processing device that is connected to a second network, the second network being different from the first network; and
an electronic device that is connected to a second network;
wherein the electronic device includes
a first processor; and
a memory that includes instructions, which when executed, cause the first processor to execute the following steps:
authenticating a user; and
upon detecting that the user is successfully authenticated, retrieving, from the information processing device, identification information of the information processing device and first authentication information that is held by the information processing device, and storing the identification that is retrieved by the first processor and the first authentication information that is retrieved by the first processor in the memory,
wherein the terminal device includes a second processor, and a memory that includes instructions, which when executed, cause the second processor to execute the following steps:
retrieving, from the electronic device in which the user is successfully authenticated, the identification information of the information processing device and the first authentication information that is held by the information processing device;
retrieving access data from the information processing device by transmitting, to the information processing device that is identified by the identification information of the information processing device, an access data retrieval request that includes the first authentication information and identification information of the terminal device; and
transmitting a request for processing to the electronic device that is connected to the second network by using the access data, and
wherein the information processing device includes a third processor, and a memory that includes instructions, which when executed, cause the third processor to execute the following steps:
providing, to the electronic device in which the user is successfully authenticated, the identification information of the information processing device and the first authentication information that is held by the information processing device;
providing, to the terminal device, the access data that is associated with the identification information of the terminal device, the identification information of the terminal device being included in the access data retrieval request, upon receiving the access data retrieval request that includes the first authentication information and the identification of the terminal device and determining that the information processing device holds the first authentication information that is identical to the first authentication information that is included in the access data retrieval request; and
transmitting, upon receiving the request for processing that is transmitted, by using the access data, from the terminal device to the electronic device that is connected to the second network and determining that the identification information of the terminal device that transmits the request for processing is identical to the identification information of the terminal device that is associated with the access data, the request for processing to the electronic device.

7. A device control method that is executed by an information processing system, the information processing system including a terminal device that is connected to a first network; and an information processing device that is connected to a second network, the second network being different from the first network, wherein the method comprises:

providing, by the information processing device, to an electronic device in which a user is successfully authenticated, identification information of the information processing device and first authentication information that is held by the information processing device;

retrieving, by the terminal device, from the electronic device in which the user is successfully authenticated, the identification information of the information processing device and the first authentication information that is held by the information processing device;

transmitting, by the terminal device, an access data retrieval request that includes the first authentication information and identification information of the terminal device to the information processing device that is identified by the identification information of the information processing device;

providing, by the information processing device, to the terminal device, the access data that is associated with the identification information of the terminal device, the identification information of the terminal device being included in the access data retrieval request, upon receiving the access data retrieval request that includes the first authentication information and the identification of the terminal device and determining that the information processing device holds the first authentication information that is identical to the first authentication information that is included in the access data retrieval request;

retrieving, by the terminal device, access data from the information processing device;

transmitting, by the terminal device, a request for processing to the electronic device that is connected to the second network by using the access data; and transmitting, by the information processing device, upon receiving the request for processing that is transmitted, by using the access data, from the terminal device to the electronic device that is connected to the second network and determining that the identification information of the terminal device that transmits the request for processing is identical to the identification information of the terminal device that is associated with the access data, the request for processing to the electronic device.

* * * * *